United States Patent [19]
Miyakawa et al.

[11] Patent Number: 5,684,922
[45] Date of Patent: Nov. 4, 1997

[54] ENCODING AND DECODING APPARATUS CAUSING NO DETERIORATION OF SOUND QUALITY EVEN WHEN SINE-WAVE SIGNAL IS ENCODED

[75] Inventors: Harumitsu Miyakawa, Shiki-gun; Shuichi Kawama, Kyoto, both of Japan

[73] Assignee: Sharp Kabushiki Kaisha, Osaka, Japan

[21] Appl. No.: 344,166

[22] Filed: Nov. 23, 1994

[30] Foreign Application Priority Data

Nov. 25, 1993 [JP] Japan .................................. 5-295015
Oct. 27, 1994 [JP] Japan .................................. 6-263562

[51] Int. Cl.$^6$ .................................................. G10L 9/00
[52] U.S. Cl. .......................................... 395/2.38; 375/241
[58] Field of Search ............................ 395/2, 2.1, 2.14, 395/2.38, 2.39; 375/240, 241; 370/83, 118

[56] References Cited

U.S. PATENT DOCUMENTS

| | | | |
|---|---|---|---|
| 5,109,417 | 4/1992 | Fielder et al. | 381/36 |
| 5,142,656 | 8/1992 | Fielder et al. | 381/37 |
| 5,161,210 | 11/1992 | Druyvesteyn et al. | 395/2 |
| 5,185,800 | 2/1993 | Mahieux | 395/2.38 |
| 5,206,884 | 4/1993 | Bhaskar | 395/2.38 |
| 5,353,375 | 10/1994 | Goto et al. | 395/2.38 |
| 5,365,553 | 11/1994 | Veldhuis et al. | 375/241 |

FOREIGN PATENT DOCUMENTS

| | | |
|---|---|---|
| 0 289 080A1 | 11/1988 | European Pat. Off. . |
| 0 447 495 B1 | 9/1991 | European Pat. Off. . |
| 0 455 738 B1 | 11/1991 | European Pat. Off. . |
| 0 506 394 A2 | 9/1992 | European Pat. Off. . |
| 0 511 692 A2 | 11/1992 | European Pat. Off. . |
| 0 513 860 A2 | 11/1992 | European Pat. Off. . |
| 0 514 949 A2 | 11/1992 | European Pat. Off. . |
| 63-285032 | 11/1988 | Japan . |
| 3-132217A | 6/1991 | Japan . |
| 4-003523A | 1/1992 | Japan . |
| 4-302531A | 10/1992 | Japan . |

OTHER PUBLICATIONS

*Patent Abstracts of Japan*, vol. 15, No. 343 (E–1106), Aug. 1986, abstracting Japanese publ. application 3–132 217–A, Fujiwara+/Sony Corp., 5 Jun. 1991.
*Patent Abstracts of Japan*, vol. 17, No. 128 (E–1333), Mar. 1993, abstracting Japanese publ. application 4–302 531–A, Tsutsui/Sony Corp., 26 Oct. 1992.

*Primary Examiner*—Benedict V. Safourek
*Attorney, Agent, or Firm*—David G. Conlin; Milton Oliver

[57] ABSTRACT

There is provided an encoding and decoding apparatus which can provide a high quality of reproduction of sound. There are provided an encoding section and a decoding section. A block length determining section of the encoding section time-sharingly divides an input signal into blocks having a block length corresponding to the degree of change of the input signal. A frequency band dividing section divides the signal of each block into a plurality of frequency bands. A bit allocating section obtains a masking threshold value-to-noise ratio of each frequency band from the magnitude of the power of each frequency band reflecting a psychoacoustic characteristic, and determines the number of quantization bits to be allocated to each frequency band based on the magnitude of the masking threshold value-to-noise ratio. A quantizing section generates a code string by quantizing the signal while allocating a specified amount of bits to each frequency band based on information from the bit allocating section. The bit allocating section receives information representing the block length from the block length determining section, and adopts a different psychoacoustic characteristic depending upon the block length.

11 Claims, 19 Drawing Sheets

ENCODING AND DECODING APPARATUS CAUSING NO DETERIORATION OF SOUND QUALITY EVEN WHEN SINE-WAVE SIGNAL IS ENCODED

BACKGROUND OF THE INVENTION

1. Field of the Invention

The present invention relates to bit allocating an encoding and decoding apparatus for executing an adaptive bit allocating operation of a musical sound and a vocal sound, and particularly to bit allocating therein.

2. Description of the Prior Art

As an encoding and decoding system for compressing an input digital signal of a musical sound, a vocal sound, and the like at a high efficiency taking advantage of a human psychoacoustic characteristic, there has been known a sub band coding system in which a signal on the time base is coded by being divided into a plurality of frequency bands, a transform coding system in which a signal on the time base is transformed into a signal on the frequency base (orthogonal transformation), divided into a plurality of frequency bands, and then coded every band, or a combination of the above-mentioned systems. The above-mentioned high-efficiency (bitrate reduction) coding systems are each effected by forming an input digital signal on the time base into blocks every specified unit time (frame) on the time base, dividing each block into several frequency bands, and then quantizing the resulting data in each frequency band to code the data.

When dividing the signal on the time base into frequency bands and transforming (orthogonally transforming) the signal into a signal on the frequency base, a long interval (referred to as a "block length" hereinafter) for analysis is set to increase the resolution in frequency when only a stationary signal exists, while the block length is reduced to increase the resolution in time when an abrupt signal change occurs according to a reference material (Japanese Patent Laid-Open Publication No. HEI 4-302531).

Meanwhile, when quantizing data in each of the frequency bands to code the data, quantization bits are required to be skillfully distributed within an originally limited total amount of coding bits. As a system for adaptively executing a bit allocating operation according to an input signal, an adaptive bit allocating system is known. According to the adaptive bit allocating system, a signal in an inaudible frequency band is deleted (no bit is allocated for quantization) taking advantage of a masking effect or a psychoacoustic characteristic such as the lower limit of audibility, and quantization bits are distributed every frequency band so that a quantization noise generated in quantizing music data is suppressed below the inaudible level.

The masking effect includes simultaneous masking and temporal masking. The simultaneous masking is defined as a phenomenon that a loud sound makes another sound be hardly heard. The temporal masking is defined as a phenomenon that a sound generated prior in time masks another sound generated later (forward masking) or the latter masks the former (reverse masking). The threshold in quiet is defined as the minimum audible sound pressure level, the threshold in quiet having a frequency characteristic such that the human auditory sensitivity peaks at and around a frequency of 4 kHz and gradually reduces to the lower frequency end and to the higher frequency end.

Among adaptive bit allocation systems, there is a system in which the masking effect is selectively exerted or not exerted according to a pattern of a signal in each block (Japanese Patent Laid-Open Publication No. HEI 3-132217).

Furthermore, among adaptive bit allocation systems, there is an iteration method that is achieved by obtaining a power S of each frequency band, obtaining a masking threshold value M (the minimum audible power) of the power of each frequency band with respect to another frequency band, calculating a masking threshold value-to-noise ratio R(m) (=M/N(m)) from a quantization noise power N(m) in the case where each frequency band is quantized in m bits, searching the minimum value R among the values R in each frequency band, allocating bits to the frequency band, renewing the value R, searching again the minimum value R, and allocating bits to the frequency band. In the present case, the method of calculating the masking threshold value M is based on the masking characteristic of a person who has an ordinary auditory characteristic.

As encoding and decoding apparatuses for executing the adaptive bit allocating operation, there can be enumerated an MD (mini disc) and a DCC (digital compact cassette). The encoding and decoding systems of the above-mentioned apparatuses are practically referred to as ATRAC (adaptive transform acoustic coding) and PASC (precision adaptive sub-band coding) respectively.

When changing the block length according to the degree of change of a signal in a conventional encoding and decoding apparatus, the bit allocating operation is executed by means of an identical auditory characteristic no matter whether the block length is long or short. Therefore, in executing a real-time coding operation, there are the drawbacks that the amount of calculation is limited by a block having a short block length, and that a differences in the auditory characteristic and the like between a case where the signal changes abruptly and a case where the signal is stationary, are not taken into account.

SUMMARY OF THE INVENTION

Accordingly, it is a first object of the present invention to provide an encoding and decoding apparatus capable of achieving an improved sound quality by changing the block length according to the degree of change of the signal and adopting an optimum auditory characteristic according to the block length based on the adaptive bit allocation system.

When an input signal is a signal having a narrow spectrum band such as a sine-wave signal (the signal referred to merely as a "sine-wave signal" hereinafter), only the frequency band including the sine-wave signal has a great power, and an abruptly reducing power results toward far ends apart from the frequency band. In the present case, the sine-wave signal exerts almost no masking influence on another frequency band (assumed to be $I_2$ for convenience) located apart from the frequency band including the sine-wave signal (assumed to be $I_1$ for convenience), and the frequency band receives the greatest masking influence from the power of the frequency band itself. As a result, there is produced a little difference between a signal-to-masking threshold value ratio (SMR) of the frequency band $I_1$ including the sine-wave signal (SMR meaning the ratio of a power S (of itself) to the masking threshold value M) and the signal-to-masking threshold value ratio (SMR) of the frequency band $I_2$ free from the masking influence of the sine-wave signal. In other words, according to a relative relationship between the signal S and a quantization noise power N, a masking threshold value-to-noise ratio (MNR) R (=M/N=(S/N)/(S/M)) of the frequency band $I_1$ and the masking threshold value-to-noise ratio (MNR) R of the frequency band $I_2$ have similar values. Since the bit allocating operation is executed based only on the masking threshold value-to-noise ratio (MNR) R in the conventional adaptive bit allocation system, the amount of bits allocated to the frequency band $I_1$ and the amount of bits allocated to the frequency band $I_2$ have similar values. For the above-mentioned reasons, if there are a lot of frequency bands $I_2$ free from the masking influence of the sine-wave signal, a reduced number of bits are allocated to the frequency band $I_1$ including the sine-wave signal, and therefore an increased quantization noise results when a quantizing operation is executed in the above-mentioned amount of bits. Therefore, when an encoded sine-wave signal is decoded, the quantization noise is heard, which may degrade the sound quality.

Accordingly, it is a second object of the present invention to provide an encoding and decoding apparatus which causes no deterioration or degradation of sound quality even when the sine-wave signal is encoded.

Furthermore, a frequency band (assumed to be $I_4$ for convenience) in the vicinity of a frequency band (assumed to be $I_3$ for convenience) having a great power possibly has a great masking threshold value M regardless of the fact that the frequency band has a great power. In such a case, a relationship of S<M holds, i.e., N(0)=S without bit allocation, and therefore the masking threshold value-to-noise ratio (MNR) R has a value greater than 1. Therefore, no bit is allocated to the frequency band $I_4$, and therefore the frequency band $I_4$ is deleted. An ordinary person who hears the sound in which the frequency band $I_4$ in the vicinity of the frequency band $I_3$ having a great power is deleted feels no sense of incongruity. However, a person who is excellent in auditory sense occasionally feels a sense of incongruity through recognition of the fact that the frequency band $I_4$ is deleted.

Accordingly, it is a third object of the present invention to provide an encoding and decoding apparatus which does not give such a sense of incongruity to a person who is excellent in auditory sense.

There is another case in which a function of emphasizing a specific frequency component such as a bass boost function is incorporated to a musical sound reproducing apparatus. Assuming that, when a sound decoded according to the aforementioned adaptive bit allocation system is reproduced by such a reproducing apparatus, sufficient number of bits are not allocated to the frequency component in the coding process and the MNR of a frequency band Is including the frequency component is slightly greater than 1, it is apprehended that the quantization noise of the frequency component may be emphasized. The above-mentioned phenomenon will now be described with reference to FIGS. 14A and 14B. FIG. 14A shows a power spectrum at a point of time, a masking threshold value, and a power spectrum of the quantization noise of a reproduction sound decoded according to the adaptive bit allocation system. A solid line $L_1$ represents the power spectrum of the reproduction sound, a dashed line $L_2$ represents the masking threshold value of the reproduction sound, and a dotted line $L_3$ represents the power spectrum of a quantization noise signal included in the reproduction sound. When a bass boost is effected at a degree as shown in FIG. 14B by means of the aforementioned reproducing apparatus, the increased quantities of spectrum components are represented by thin lines $l_1$, $l_2$, and $l_3$ of the respective lines in FIG. 14A. The axes of the graph shown in FIG. 14B have the same scales as those of FIG. 14A. As apparent from FIG. 14A, the masking threshold value is increased in the low-frequency region together with the bass boost of the reproduction sound. However, more attention should be paid to the fact that there exists a portion where the power of the quantization noise is increased to disadvantageously exceed the masking threshold value. In the above-mentioned portion, there is a problem that the quantization noise is perceived.

Accordingly, it is a fourth object of the present invention to provide an encoding and decoding apparatus capable of, when reproducing a decoded sound by means of a reproducing apparatus having the function of emphasizing a specific frequency component, suppressing the quantization noise in the frequency band including the emphasized frequency component, and thereby preventing the possible deterioration of sound quality.

In order to attain the first object of the present invention, a first aspect of the present invention provides an encoding and decoding apparatus having an encoding section for encoding a digital input signal composed of a musical sound, a vocal sound, or a combination of the sounds, and a decoding section for decoding a signal encoded by the encoding section, wherein the encoding section comprises:
  a block length determining section which time-sharingly divides the input signal into blocks each having a specified block length according to a degree of change of the input signal;
  a frequency band dividing section which divides a signal of each of the blocks into a plurality of frequency bands to generate a frequency band signal;
  a bit allocating section which obtains a masking threshold value-to-noise ratio from a magnitude of a power of each of the frequency bands reflecting a psychoacoustic characteristic, and determines a number of quantization bits to be allocated to each of the frequency bands based on a magnitude of the masking threshold value-to-noise ratio; and
  a quantizing section which receives information representing the quantization bit number from the bit allocating section, and quantizes the frequency band signal while allocating a specified number of bits to each of the frequency bands based on the information to generate a code string, and wherein
  the bit allocating section comprises means for adopting a varied psychoacoustic characteristic according to the block length by receiving information representing the block length from the block length determining section.

According to the encoding and decoding apparatus of the first aspect of the present invention, the bit allocating section of the encoding section receives the information representing the block length from the block length determining section, and adopts a varied Psychoacoustic characteristic according to the block length. With the above-mentioned arrangement, when the block length is long, a psychoacoustic characteristic which produces a great masking effect though it requires a great amount of calculation, e.g., the simultaneous masking, can be applied. When the block length is short, a psychoacoustic characteristic which produces a small masking effect though it requires a reduced amount of calculation, e.g., the temporal masking, can be applied. In other words, an antinomic relationship between the amount of calculation and the accuracy of the masking threshold value can be overcome to allow an optimum psychoacoustic characteristic to be always adopted, thus reducing the quantization noise. Therefore, a high-quality reproduction sound can be obtained.

In order to achieve the second object of the present invention, a second aspect of the present invention provides an encoding and decoding apparatus having an encoding section for encoding a digital input signal composed of a musical sound, a vocal sound, or a combination of the sounds, and a decoding section for decoding a signal encoded by the encoding section, wherein the encoding section comprises:
a frequency band dividing section which divides the input signal into a plurality of frequency bands every specified time division unit to generate a frequency band signal;
a bit allocating section which obtains a masking threshold value-to-noise ratio from a magnitude of a power of each of the frequency bands reflecting a psychoacoustic characteristic, and determines an number of quantization bits to be allocated to each of the frequency bands based on a magnitude of the masking threshold value-to-noise ratio; and
a quantizing section which receives information representing the quantization bit number from the bit allocating section, and quantizes the frequency band signal while allocating a specified number of bits to each of the frequency bands based on the information to generate a code string, and wherein
the bit allocating section comprises means for limiting a maximum number of bits to be allocated to each of the frequency bands every frequency band.

According to the encoding and decoding apparatus of the second aspect of the present invention, the bit allocating section of the encoding section limits the maximum number of bits allocated to each frequency band every frequency band. With the above-mentioned arrangement, the maximum number of allocatable quantization bits can be limited regardless of the magnitude of the masking threshold value-to-noise ratio (MNR) in regard to the frequency band $I_2$ having a small power located apart from the frequency band $I_1$ having a great power among the plural number of frequency bands. In detail, when a sine-wave signal is inputted, the maximum bit number of the frequency band $I_2$ having a small power located apart from the frequency band $I_1$ including a sine-wave signal can be effectively limited even if the frequency band $I_2$ has a masking threshold value-to-noise ratio (MNR) having the same magnitude as that of the frequency band $I_1$ including the sine-wave signal. As a result, the bits which would have been allocated to the frequency band $I_2$ having a small power are allocated more to another frequency band, in particular, the frequency band $I_1$ including the sine-wave signal. Therefore, when the sine-wave signal is decoded, the quantization noise is reduced in comparison with the conventional case, thereby improving the sound quality.

In an embodiment, said means of the bit allocating section determines, based on a ratio of a power of all the frequency bands to a power of one frequency band, the maximum number of bits to be allocated to the one frequency band.

According to the encoding and decoding apparatus of the embodiment, the bit allocating section of the encoding section determines the maximum number of bits to be allocated to one frequency band based on the ratio of the power of all the frequency bands to the power of the one frequency band. In the present case, the allocation of bits to the frequency band having a small power can be effectively limited when the input signal is great.

In an embodiment, said means of the bit allocating section determines, based on a magnitude of a power of one frequency band, the maximum number of bits to be allocated to the one frequency band.

According to the encoding and decoding apparatus of the embodiment, the bit allocating section of the encoding section determines the maximum number of bits to be allocated to one frequency band based on the magnitude of the power of the one frequency band. In the present case, the allocation of bits to the frequency band having a small power can be effectively limited when the input signal is small.

In an embodiment, said means of the bit allocating section determines, based on a ratio of a power of all the frequency bands to a power of one frequency band and a magnitude of the power of the one frequency band, the maximum number of bits to be allocated to each of the frequency bands.

According to the encoding and decoding apparatus of the embodiment, the bit allocating section of the encoding section determines the number of quantization bits to be allocated to each frequency band based on the ratio of the power of all the frequency bands to the power of one frequency band and the magnitude of the power of the one frequency band. In the present case, the allocation of bits to the frequency band having a small power can be effectively limited regardless of the magnitude of the input signal.

When the limitation on the maximum bit number in the bit allocating section is severe, an insufficient number of bits are allocated to the frequency band $I_2$ having a small power located apart from the frequency band $I_1$ having a great power, and therefore the quantization noise in the frequency band $I_2$ is possibly heard. The above-mentioned phenomenon occurs when the masking threshold value-to-noise ratio (MNR), of the frequency band $I_2$ having a small power, is not greater than 1.

Therefore, in an embodiment, the bit allocating section comprises means for releasing a limitation on the maximum amount of bits to be allocated to the one frequency band when the masking threshold value-to-noise ratio of the one frequency band is not greater than one.

According to the encoding and decoding apparatus of the embodiment, when the masking threshold value-to-noise ratio of one frequency band is not greater than 1, the limitation on the maximum amount of bits allocated to the one frequency band is released. By so doing, the bit allocation is effected until the masking threshold value-to-noise ratio exceeds 1 in the frequency band of which maximum bit amount is originally limited, and the bit allocation is immediately stopped at a point of time when the masking threshold value exceeds 1. Therefore, the quantization noise in the frequency band $I_1$ including the sine-wave signal is reduced in the same manner as in the encoding and decoding apparatus of the second aspect of the present invention, and furthermore the quantization noise in the frequency band $I_2$ having a small power is reduced. Therefore, the sound quality can be improved in the decoding stage.

Furthermore, when the limitation on the maximum bit amount in the bit allocating section is severe, it is possible that the total amount of allocated quantization bits may not reach a specified total number of bits allocatable to all the frequency bands regardless of the fact that the number of bits of all the frequency bands is equal to (or exceed) the maximum bit number. In other words, due to the fact that the maximum bit number of each frequency band is small, it is apprehended that allocatable bits may remain.

Therefore, in an embodiment, the bit allocating section comprises means for deciding whether the number of bits allocated to each of the frequency bands is equal to the maximum bit number when a total number of allocated quantization bits does not reach a specified total number of bits allocatable to all the frequency bands, and alleviating or releasing the limitation on the maximum bit number when the number of bits allocated to each of the frequency bands is equal to the maximum bit number.

According to an encoding and decoding apparatus of the embodiment, when the total number of allocated bits does not reach the specified total number of bits allocatable to all the frequency bands, the bit allocating section decides whether the number of bits allocated to each frequency band is equal to the maximum bit number of each frequency band, and when the number of bits allocated to each frequency band is equal to the maximum bit number of each frequency band, the limitation on the maximum bit number is alleviated or released. Therefore, the bit allocation is effectively executed within a range of the total number of quantization bits. In other words, some extra bits are allocated to the frequency band $I_2$ having a small power to which bits smaller in number than the proper number of bits have been allocated due to the aforementioned limitation. With the above-mentioned arrangement, the masking threshold value-to-noise ratio (MNR) of the frequency band $I_2$ is improved, thereby improving the sound quality in the decoding stage.

In order to achieve the third object, a third aspect of the present invention provides an encoding and decoding apparatus having an encoding section for encoding a digital input signal composed of a musical sound, a vocal sound, or a combination of the sounds, and a decoding section for decoding a signal encoded by the encoding section, wherein the encoding section comprises:
  a frequency band dividing section which divides the input signal into a plurality of frequency bands every specified time division unit to generate a frequency band signal;
  a bit allocating section which obtains a masking threshold value-to-noise ratio from a magnitude of a power of each of the frequency bands reflecting a psychoacoustic characteristic, and determines an number of quantization bits to be allocated to each of the frequency bands based on a magnitude of the masking threshold value-to-noise ratio; and
  a quantizing section which receives information representing the quantization bit number from the bit allocating section, and quantizes the frequency band signal while allocating a specified number of bits to each of the frequency bands based on the information to generate a code string, and wherein
  the bit allocating section comprises means for deciding whether a ratio of a power of one frequency band to a power of all the frequency bands is not smaller than a specified ratio, and allocating at least a minimum number of quantization bits to the one frequency band having a power not smaller in ratio than the specified ratio regardless of a magnitude of the masking threshold value- to-noise ratio.

According to the encoding and decoding apparatus of the third aspect of the present invention, the bit allocating section of the encoding section decides whether the ratio of the power of one frequency band to the power of all the frequency bands is not smaller than a specified ratio, and allocates at least a minimum number of quantization bits to the one frequency band having the power not smaller in ratio than the specified ratio regardless of the magnitude of the masking threshold value-to-noise ratio. With the above-mentioned arrangement, the frequency band $I_4$ having a power not smaller in ratio than a specified ratio is not completely deleted due to the influence of the power of another frequency band $I_3$. Therefore, unlike the conventional case, no sense of incongruity is given to a person who is excellent in auditory sense, thereby allowing a high-quality reproduction sound to be provided.

There is the possibility that a function of emphasizing a specific frequency component such as a bass boost function is attached to a musical sound reproducing apparatus. When a sound decoded according to the adaptive bit allocation system is reproduced in such a reproducing apparatus, if insufficient bits are allocated to the frequency component in the encoding stage and the masking threshold value-to-noise ratio (MNR) of the frequency band Is including the frequency component is slightly greater than 1, it is apprehended that the quantization noise of the frequency component may be emphasized.

Therefore, a fourth aspect of the present invention provides an encoding and decoding apparatus having an encoding section for encoding a digital input signal composed of a musical sound, a vocal sound, or a combination of the sounds, and a decoding section for decoding a signal encoded by the encoding section, wherein the encoding section comprises:
  a frequency band dividing section which divides the input signal into a plurality of frequency bands every specified time division unit to generate a frequency band signal;
  a bit allocating section which obtains a masking threshold value-to-noise ratio from a magnitude of a power of each of the frequency bands reflecting a psychoacoustic characteristic, and determines an number of quantization bits to be allocated to each of the frequency bands based on a magnitude of the masking threshold value-to-noise ratio; and
  a quantizing section which receives information representing the quantization bit number from the bit allocating section, and quantizes the frequency band signal while allocating a specified number of bits to each of the frequency bands based on the information to generate a code string, and wherein
  the bit allocating section comprises means for allocating a predetermined number of extra bits to a predetermined frequency band.

According to the encoding and decoding apparatus of the fourth aspect of the present invention, the bit allocating section of the encoding section allocates a predetermined number of extra bits to the predetermined frequency band Is. With the above-mentioned arrangement, the quantization noise in the predetermined frequency band Is is reduced further than in the normal case. Therefore, when the noise is emphasized in the emphasizing process by the reproducing apparatus, the noise will be not perceived.

In an embodiment, the bit allocating section comprises means for allocating to the frequency bands an number of bits obtained by subtracting an number of extra bits to be allocated to the predetermined frequency band from a total number of quantization bits allocatable to all the frequency bands, and subsequently adding to an number of bits allocated to the predetermined frequency band the number of extra bits to be allocated.

According to the encoding and decoding apparatus of the embodiment, the bit allocating section of the encoding section allocates to each frequency band the number of remaining bits obtained by subtracting the number of extra bits to be allocated to the specified frequency band Is from the total number of quantization bits allocatable to all the frequency bands, and subsequently adds to the number of bits allocated to the specified frequency band Is the number of extra bits to be allocated. With the above-mentioned arrangement, the number of bits allocated to all the frequency bands finally falls within the range of the total number of quantization bits.

In an embodiment, the bit allocating section comprises means for obtaining a signal-to-masking threshold value ratio of each of the frequency bands from a magnitude of a power of the frequency band, adding a predetermined value to the signal-to-masking threshold value ratio of the predetermined frequency band to obtain a modified signal-to-masking threshold value ratio, and thereafter obtaining the masking threshold value-to-noise ratio by means of the modified signal-to-masking threshold value ratio.

According to the encoding and decoding apparatus of the embodiment, the bit allocating section of the encoding section obtains the signal-to-masking threshold value ratio (SMR) of each frequency band from the magnitude of the power of the frequency band. After adding a predetermined value to the signal-to-masking threshold value ratio (SMR) of the specified frequency band Is to obtain a modified signal-to-masking threshold value ratio, the bit allocating section obtains the masking threshold value-to-noise ratio (MNR) by means of the modified signal-to-masking threshold value ratio (SMR). With the above-mentioned arrangement, more bits are to be allocated to the frequency band Is due to the number of increase of the signal-to-masking threshold value ratio (SMR), and therefore the quantization noise in the specified frequency band Is is reduced in the same manner as in the encoding and decoding apparatus of the fourth aspect of the present invention. As a result, the quantization noise can be prevented from exceeding the masking threshold value, and the quantization noise will be not perceived. Furthermore, the bit allocation in the above-mentioned case takes into account the balance of the signal-to-masking threshold value ratios (SMRs) of all the frequency bands. In other words, if the specified frequency band Is to be emphasized has no signal component, the signal-to-masking threshold value ratio (SMR) of the frequency band Is originally has a negative infinite value or a value equivalent to the value in terms of decibel. Therefore, the addition due to the emphasis is ignored, and no bit is allocated to the frequency band Is. Therefore, futility in the bit allocating operation can be eliminated. When the signal itself or the quantization noise of the frequency band Is is masked by the signal of another frequency band if the emphasis is effected, the masking threshold value-to-noise ratio (MNR) prior to the bit allocating process is made to have a value greater than that of another frequency band that is not masked (although the value is smaller than the value prior to the emphasis process, it is still greater than the MNR of the frequency band that is not masked). Therefore, fewer bits are allocated to the frequency band Is. Therefore, the futile allocation of bits can be prevented.

A fifth aspect of the present invention provides an encoding and decoding apparatus having an encoding section for encoding a digital input signal composed of a musical sound, a vocal sound, or a combination of the sounds, and a decoding section for decoding a signal encoded by the encoding section, wherein the encoding section comprises:

a block length determining section which time-sharingly divides the input signal into blocks each having a specified block length according to a degree of change of the input signal;

a frequency band dividing section which divides a signal of each of the blocks into a plurality of frequency bands to generate a frequency band signal;

a bit allocating section which obtains a masking threshold value-to-noise ratio from a magnitude of a power of each of the frequency bands reflecting a psychoacoustic characteristic, and determines an number of quantization bits to be allocated to each of the frequency bands based on a magnitude of the masking threshold value-to-noise ratio; and a quantizing section which receives information representing the quantization bit number from the bit allocating section, and quantizes the frequency band signal while allocating a specified number of bits to each of the frequency bands based on the information to generate a code string, and wherein the bit allocating section comprises two or more means out of four means of: means for adopting a varied psychoacoustic characteristic according to the block length by receiving information representing the block length from the block length determining section; means for limiting a maximum number of bits to be allocated to each of the frequency bands every frequency band; means for deciding whether a ratio of a power of one frequency band to a power of all the frequency bands is not smaller than a specified ratio, and allocating at least a minimum number of quantization bits to the one frequency band having a power not smaller in ratio than the specified ratio regardless of a magnitude of the masking threshold value-to-noise ratio; and means for allocating a predetermined number of extra bits to a predetermined frequency band.

According to the encoding and decoding apparatus of a fifth aspect of the present invention, the bit allocating section of the encoding section has two or more means out of the four means owned by the bit allocating sections of the first, second, third and fourth aspects of the present invention. With the above-mentioned arrangement, a function obtained by combining the functions of two or more of the above-mentioned four functions of the first, second, third, and fourth aspects of the present invention can be provided.

Furthermore, although the above-mentioned embodiments are implemented by hardware, they can be also implemented entirely by software operating on an apparatus such as a digital signal processor.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Encoding and decoding apparatuses of several preferred embodiments of the present invention will now be described in detail.

Figure 1:
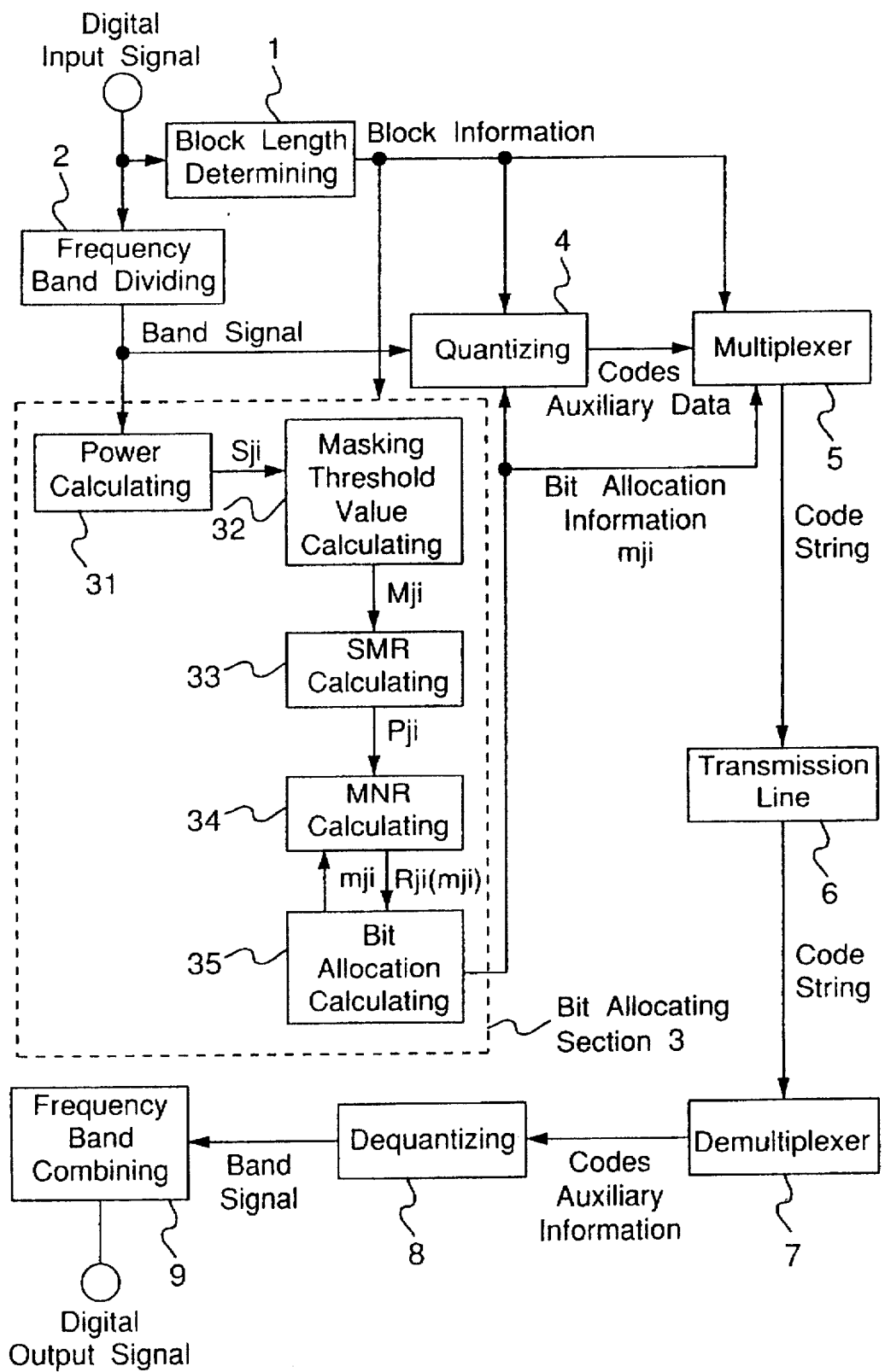
FIG. 1 is a block diagram of an encoding and decoding apparatus according to a first embodiment of the present invention.

FIG. 1 is a block diagram of an encoding and decoding apparatus according to a first preferred embodiment.

The present encoding and decoding apparatus includes: an encoding section comprised of a block length determining section 1, a frequency band dividing section 2, a bit allocating section 3, a quantizing section 4, and a multiplexer 5; a transmission line 6; and a decoding section comprised of a demultiplexer 7, a dequantizing section 8, and a frequency band combining section 9. The bit allocating section 3 includes a power calculating section 31, a masking threshold value calculating section 32, an SMR (signal-to-masking threshold value ratio) calculating section 33, an MNR (masking threshold value-to-noise ratio) calculating section 34, and a bit allocation composed section 35. The transmission line 6 is storage system.

For convenience in description, an operation of the entire encoding and decoding apparatus will be described first, and thereafter an operation of the bit allocating section 3 will be described.

A digital input signal is firstly inputted to the block length determining section 1 of the encoding section. The block length determining section 1 determines a block length based on the degree of change of the input signal. In detail, a block having a great length (the amount of samples: 1024) is divided into eight sub-blocks having a short block length. When a ratio in maximum amplitude of a sub-block to an adjacent sub-block is not smaller than a specified value, a short block length is selected. In the other case, a long block length is selected. It is herein assumed that a sub-block number j is j=0 to 7. In the case of the long block length, the sub-block is the same as the block (j=0).

The input signal having the thus determined block length is divided into a plurality of frequency bands in the frequency band dividing section 2. As a dividing system, there is a frequency conversion system such as Fourier transformation and a band pass filter bank and the like. When a frequency conversion system is adopted, a frequency band is assumed to be composed of a plurality of frequency components obtained through a conversion process.

A frequency band signal is inputted to the bit allocating section 3 and the quantizing section 4. The bit allocating section 3 obtains a quantization bit number from a frequency band signal in a manner as described hereinafter, and transmits the obtained information to the quantizing section 4. The quantizing section 4 quantizes the frequency band signal based on the information to convert the signal into codes.

The thus obtained codes and side information such as bit allocation information and block length information (the side information are necessary for decoding the codes in the decoding section and depends on the quantizing and coding systems) of each frequency band signal are multiplexed in the multiplexer 5, and then transmitted as a code string to the transmission line 6.

The demultiplexer 7 of the decoding section takes in the code string from the transmission line 6, and separates the same into the codes and side information such as the bit allocation information and block length information of each frequency band signal. Then the codes of each frequency band signal are decoded by means of the side information, and then dequantized in the dequantizing section 8 based on the side information such as the bit allocation information to be restored into the frequency band signal. The signal is combined in the frequency band combining section 9 to be formed into a digital output signal.

Then the operation of the bit allocating section 3 of the encoding section will now be described in detail.

First of all, a power $S_{ji}$ of each frequency band is obtained in the power calculating section 31 in regard to a digital input signal having a determined block length. It is herein assumed that i represents an index (an integer not smaller than 0) for discriminating the frequency band.

Figure 2:
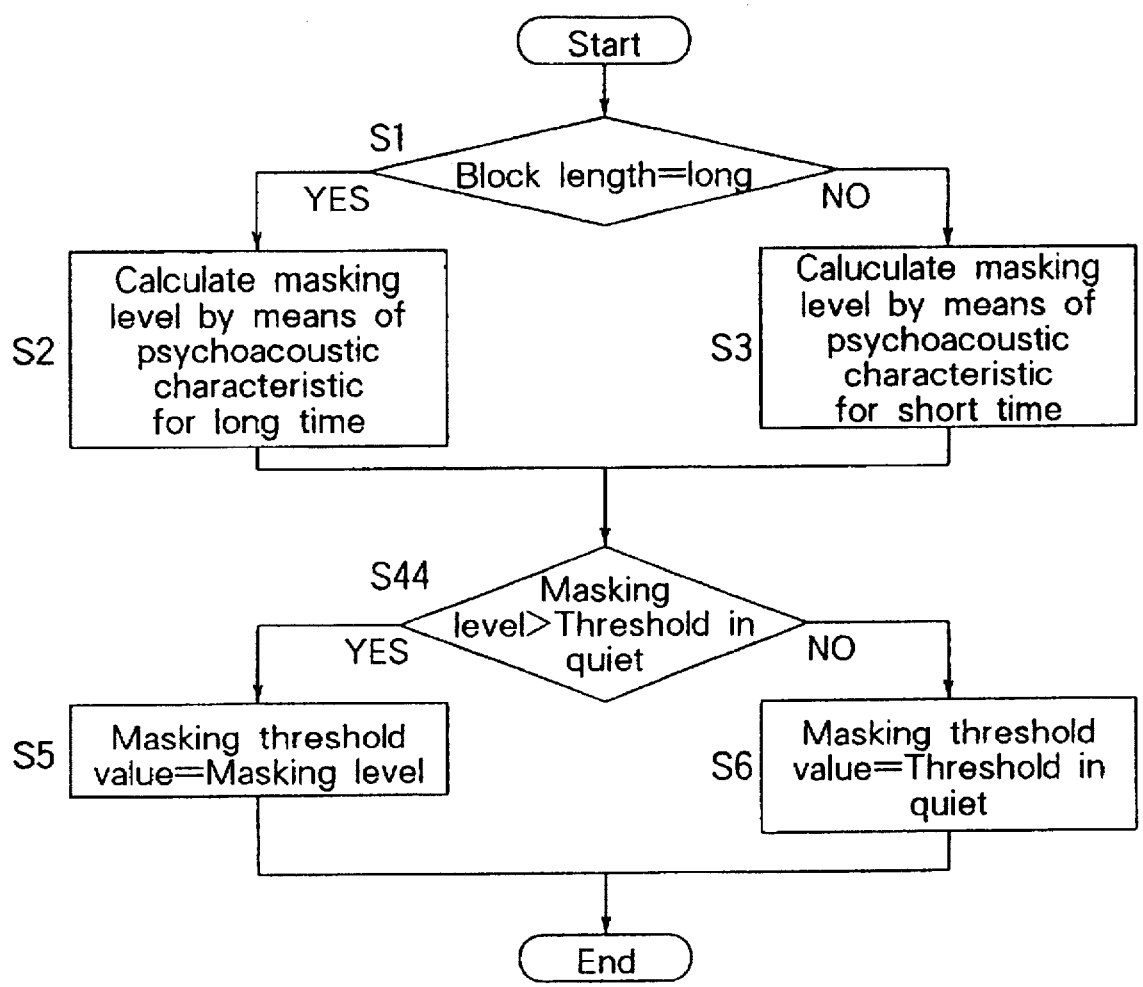
FIG. 2 is a flowchart of a procedure of calculating a masking threshold value in a masking threshold value calculating section of the encoding and decoding apparatus of the first embodiment.
Figure 17A:
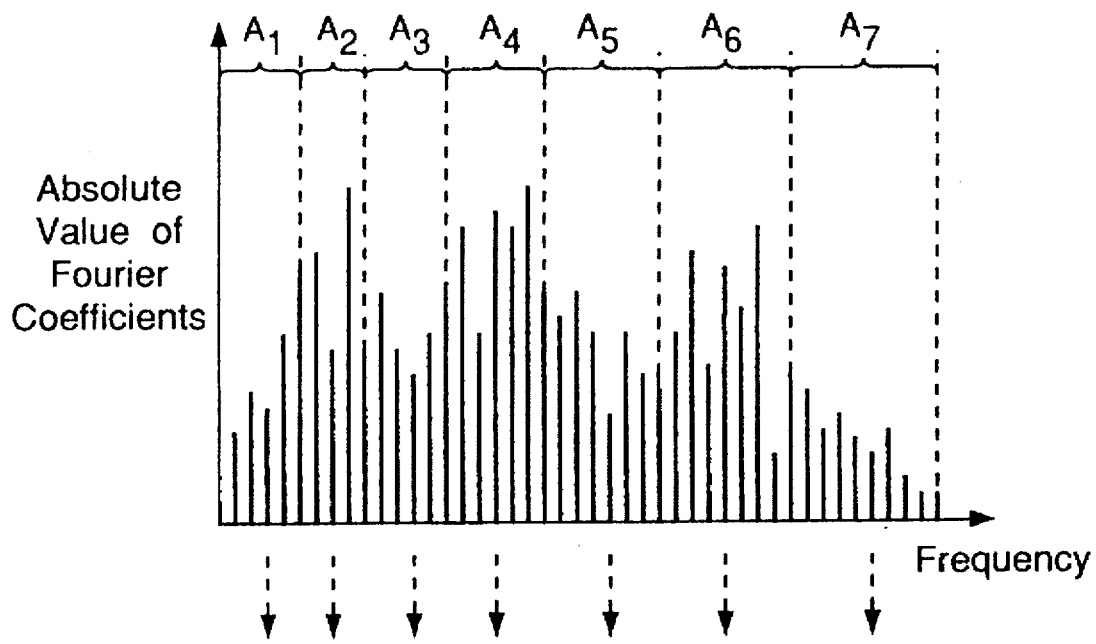
FIGS. 17A and 17B are graphs for explaining a way of obtaining a masking curve according to a simultaneous masking method.
Figure 17B:
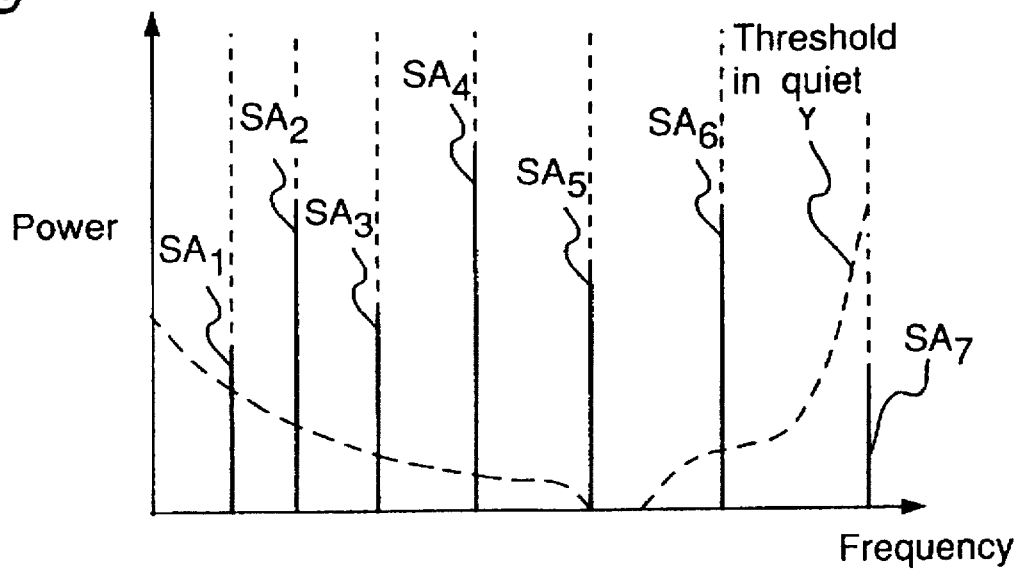
Figure 18:
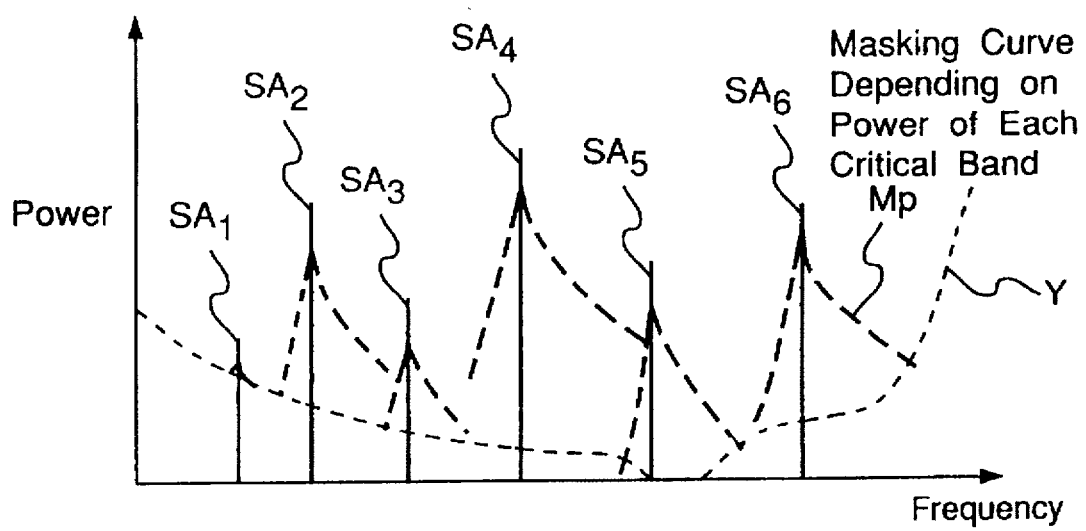
FIG. 18 is a graph for explaining a way of obtaining a masking curve according to the simultaneous masking method.
Figure 19:
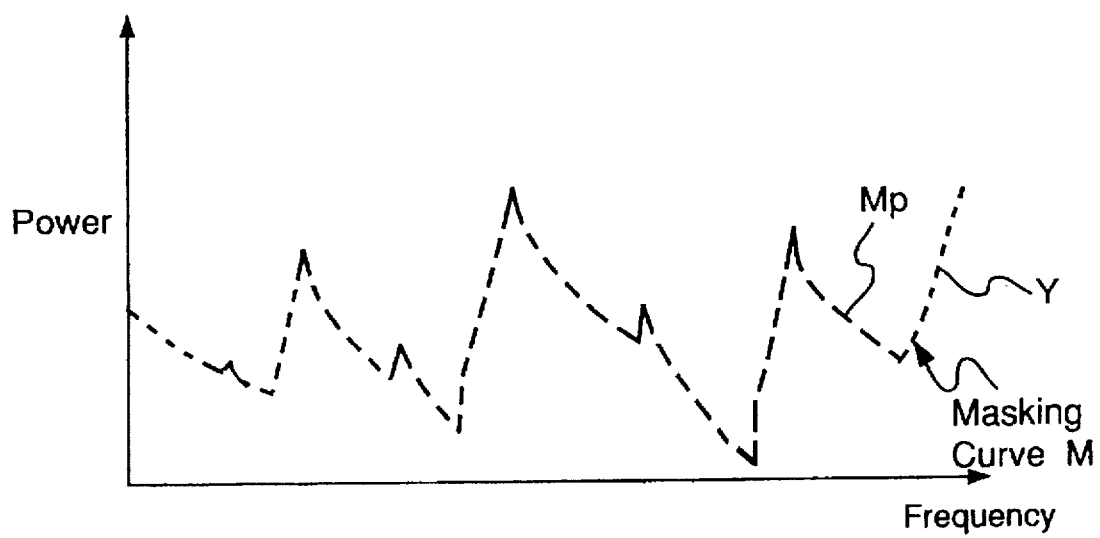
FIG. 19 is a graph showing an obtained masking curve.
Figure 20:
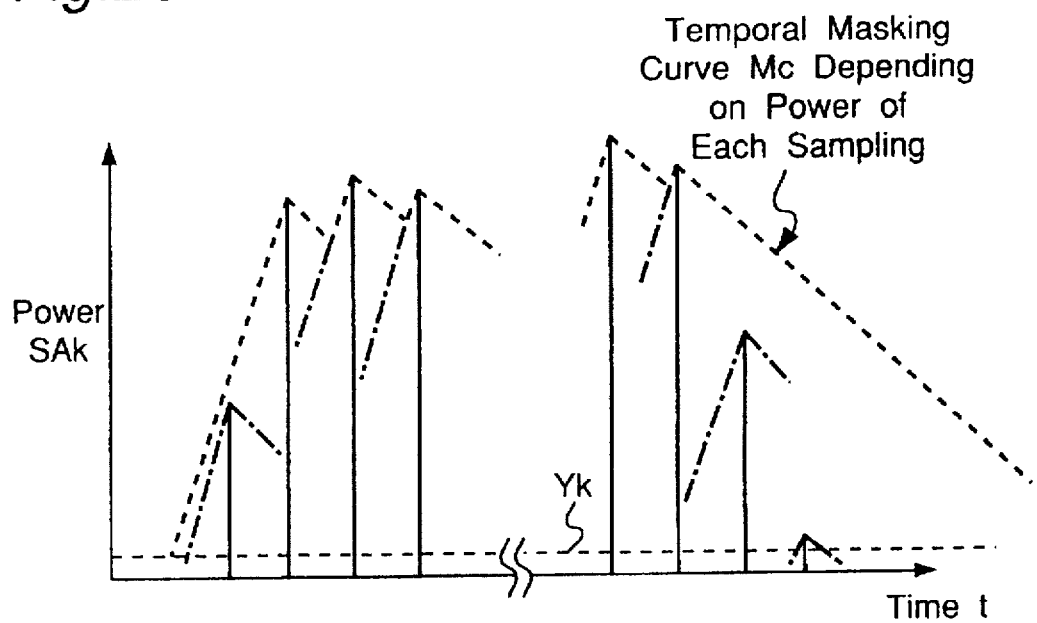
FIG. 20 is a graph for explaining a way of obtaining a masking curve according to a temporal masking method.

Then an optimum psychoacoustic characteristic is adopted according to the determined block length in a manner as shown in a flowchart of FIG. 2 to obtain a masking threshold value $M_{ji}$ of each frequency band in the masking threshold value calculating section 32. In detail, it is firstly decided whether the determined block length is long or short (S1). When the block length is long, a masking level is calculated according to a known method by using, for example, the simultaneous masking as a psychoacoustic characteristic (S2). For instance, firstly the digital input signal is subjected to a Fourier transformation process in a manner as shown in FIG. 17A to obtain the absolute values of the Fourier coefficients (expressed in the form of a histogram). In FIG. 17A, the dashed lines extending vertically represent the boundaries between critical bands, i.e., the boundaries between bands $A_1, A_2, \ldots, A_7$ each of which is a unit of analysis on the assumption that a human being is auditorily performing a frequency analysis. Then in a manner as shown in FIG. 17B, a sum of the squares of the Fourier coefficients in the critical bands $A_1, A_2, \ldots, A_7$ are obtained as powers $SA_1, SA_2, \ldots, SA_7$ of the critical bands, and the powers $SA_1, SA_2, \ldots, SA_7$ are placed at the higher ends of the critical bands $A_1, A_2, \ldots, A_7$, respectively. Then the powers $SA_1, SA_2, \ldots, SA_7$ of the critical bands are each compared with a threshold in quiet Y. Any of the powers greater than the threshold in quiet Y is made to remain as it is, while any of the powers smaller than the threshold in quiet Y is made to be 0. In the present example, the power $SA_7$ is masked to be 0. Then, as shown in FIG. 18, masking curves Mp (represented by dashed lines) each having a peak at a height depending on the value of each power are obtained at the places of the powers $SA_1, SA_2, \ldots, SA_6$ of the remaining critical bands (the higher ends of the critical bands $A_1, A_2, \ldots, A_7$). When the block length is short, a masking level is calculated according to a known method by using, for example, the temporal masking as a psychoacoustic characteristic (S3). In detail, the digital input signal is subjected to a Fourier transformation process in the same manner as in step S2 to obtain the absolute values of the Fourier coefficients, and a sum of the squares of the Fourier coefficients in the critical bands $A_1, A_2, \ldots, A_7$ are obtained as powers $SA_1, SA_2, \ldots, SA_7$ of the critical bands. FIG. 20 shows a condition in which the value of a power SAk is sampled in a specified cycle in a kth critical band Ak. In FIG. 20, masking curves Mc (represented by dashed lines) each having a peak at a height depending on the power SAk at each sampling time t are obtained in each sampling position (time t). In the above case, low peaks (represented by one-dot chain lines) hidden below high peaks are ignored. The threshold in quiet Yk is constant in the direction of the time t. Then the masking level obtained at a step S2 or S3 is compared in magnitude with the threshold in quiet Yk (S4), and the greater one is selected as the masking threshold value (S5 and S6). Thus, as exemplified in FIG. 19, an envelope of the masking curves Mp depending on the power of the critical bands and the threshold in quiet Y can be obtained as a total masking curve M. In regard to the psychoacoustic characteristic adopted based on the block length, there can be considered a variety of patterns and degrees other than those of the above-mentioned example.

Figure 21:
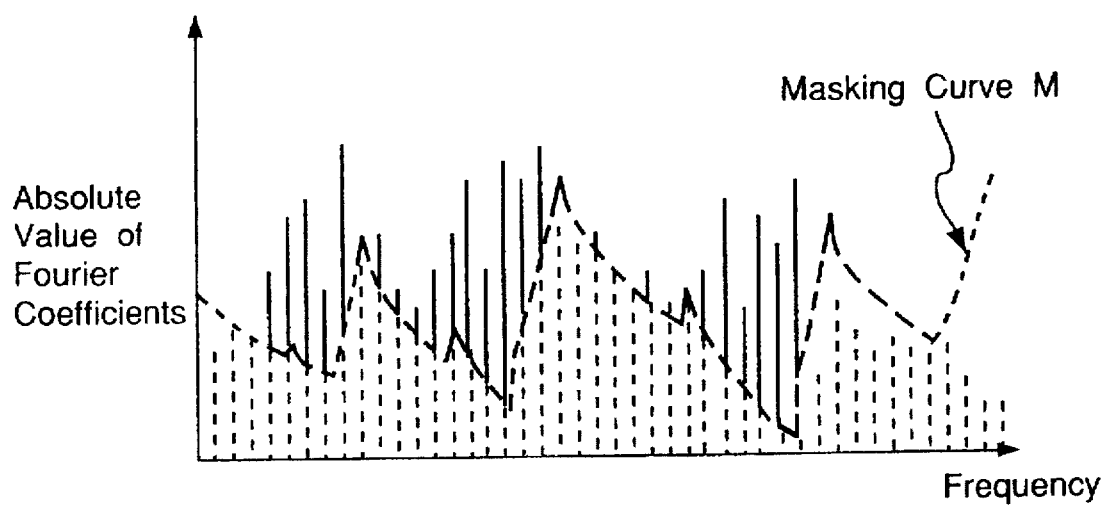
FIG. 21 is a graph for explaining a way of obtaining a signal-to-masking threshold value ratio (SMR) of each frequency band.

Then a signal-to-masking threshold value ratio Pji of each frequency band is obtained in the SMR calculating section 33 shown in FIG. 1 according to the following equation:

$$Pji = Sji/Mji \quad (1)$$

where Pji is also expressed as SMR that is a ratio of the Fourier coefficients of each frequency band to the masking curve (threshold value). For instance, as shown in a logarithmic graph of FIG. 21, the length of each of portions of the absolute values of the Fourier coefficients in each frequency band exceeding the masking threshold value M (the portions represented by solid lines) corresponds to a positive SMR.

Then, while obtaining a masking threshold value-to-noise ratio Rji(m) of each frequency band in the MNR calculating section 34, the quantization bit number m of each frequency band is determined. The masking threshold value-to-noise ratio Rji(m) is obtained according to the following equation:

$$Rji(m) = Q(m)/Pji \quad (2)$$

where Q(m) is a signal-to-quantization noise power ratio Q(m) in the case where a frequency band is quantized in m bits. Although the ratio Q(m) can be calculated according to Sji/N(m), the ratio can be preparatorily obtained through a statistical process taking advantage of signal characteristics. N(m) is a quantization noise power in the case where the quantization is effected in m bits.

Figure 3:
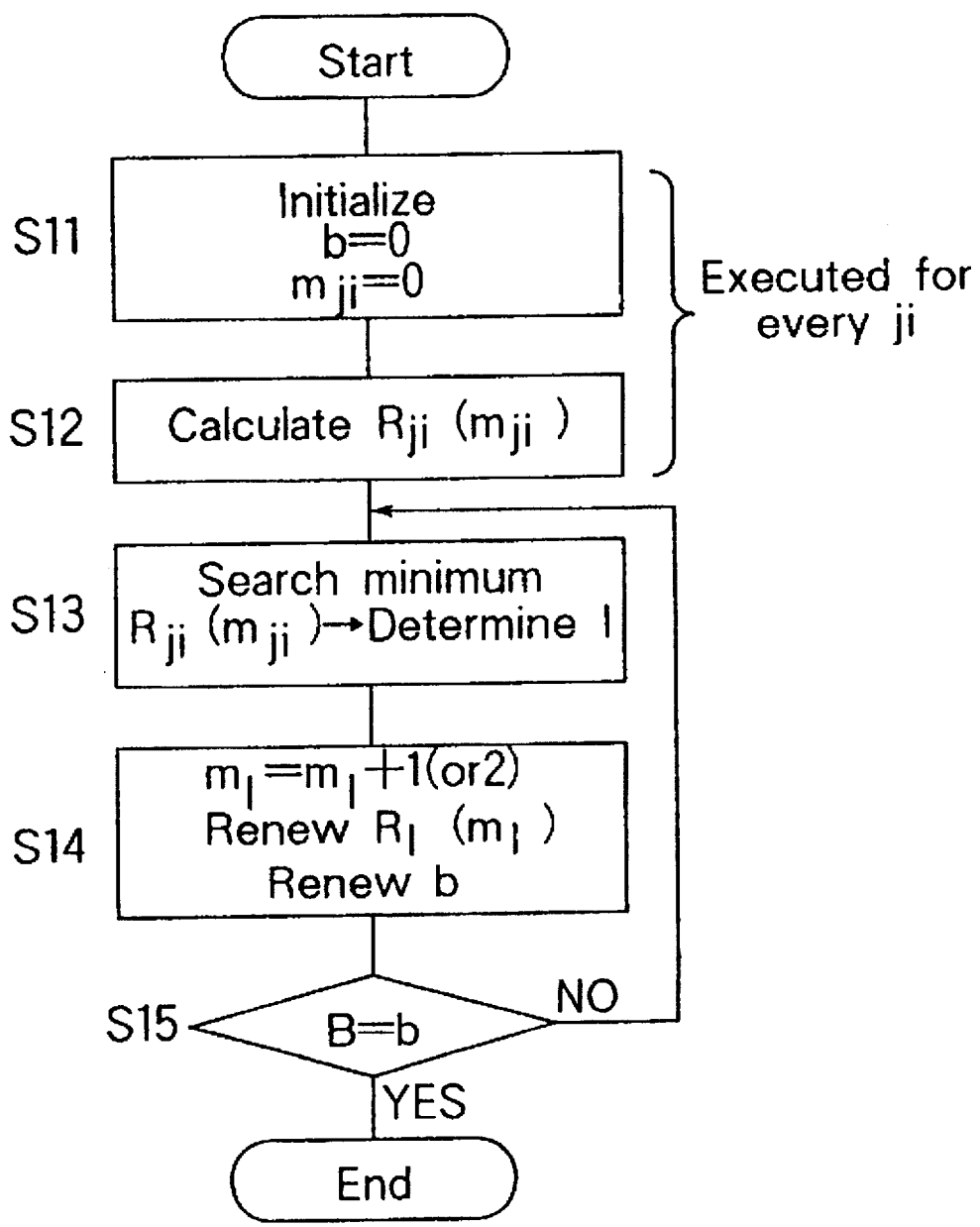
FIG. 3 is a flowchart of a procedure of allocating bits by means of the encoding and decoding apparatus of the first embodiment.

Then the quantization bit number m of each sub-block and each frequency band is determined in the bit allocation calculating section 35 according to a flowchart as shown in FIG. 3. It is assumed herein that the total number of allocatable quantization bits is B. First, an initialization is executed at step S11. In detail, a number of 0 is entered into a variable b representing the total number of allocated bits up to the present time, while the quantization bit number of each sub-block and each frequency band is determined to be mji, and a number of 0 is entered into mji. Then at S12, Rji(mji) is calculated according to Equation (2). At S13, a minimum Rji(mji) is searched (the indexes j and i of the frequency band at the above-mentioned time are determined to be J and I). A number of 1 (or the minimum quantization bit amount (normally 2) when $m_{JI}$ is 0) is added to mji at S14. Then the $R_{JI}(m_{JI})$ at the above-mentioned time is renewed according to Equation (2). Meanwhile, the same number as the number of bits allocated to the present J and I are added to the variable b. In other words, (the number of objective signals to be quantized included in the frequency band JI)×1 (or the minimum quantization bit amount 2 when $m_{JI}$ is 0) is added to the variable b. At S15, it is checked whether the variable b coincides with the total number B of the allocatable quantization bits. If they do not coincide with each other, the program flow returns to S13 to continue the bit allocating operation. When they coincide with each other, the bit allocating operation is completed. The above-mentioned operation is repeated for all the sub-blocks. In other words, the operation is effected only for j=0 in the case of a long block length, or repeated for j =0 to 7 in the case of a short block length.

According to the present encoding and decoding apparatus as described above, the block length is determined according to the degree of change of the input signal in the block length determining section 1. Then according to the length of the determined block length, the masking threshold value calculating section 32 selects a psychoacoustic characteristic. Therefore, when the block length is long, a psychoacoustic characteristic which has a great masking effect though it requires a great amount of calculation can be adopted. When the block length is short, the amount of calculation can be reduced by adopting only the temporal masking as a psychoacoustic characteristic. In other words, an antinomic relationship between the amount of calculation and the accuracy of the masking threshold value can be overcome, thereby consistently adopting the optimum psychoacoustic characteristic to thereby allow the quantization noise to be reduced. Therefore, a high-quality reproduction sound can be obtained.

Figure 4:
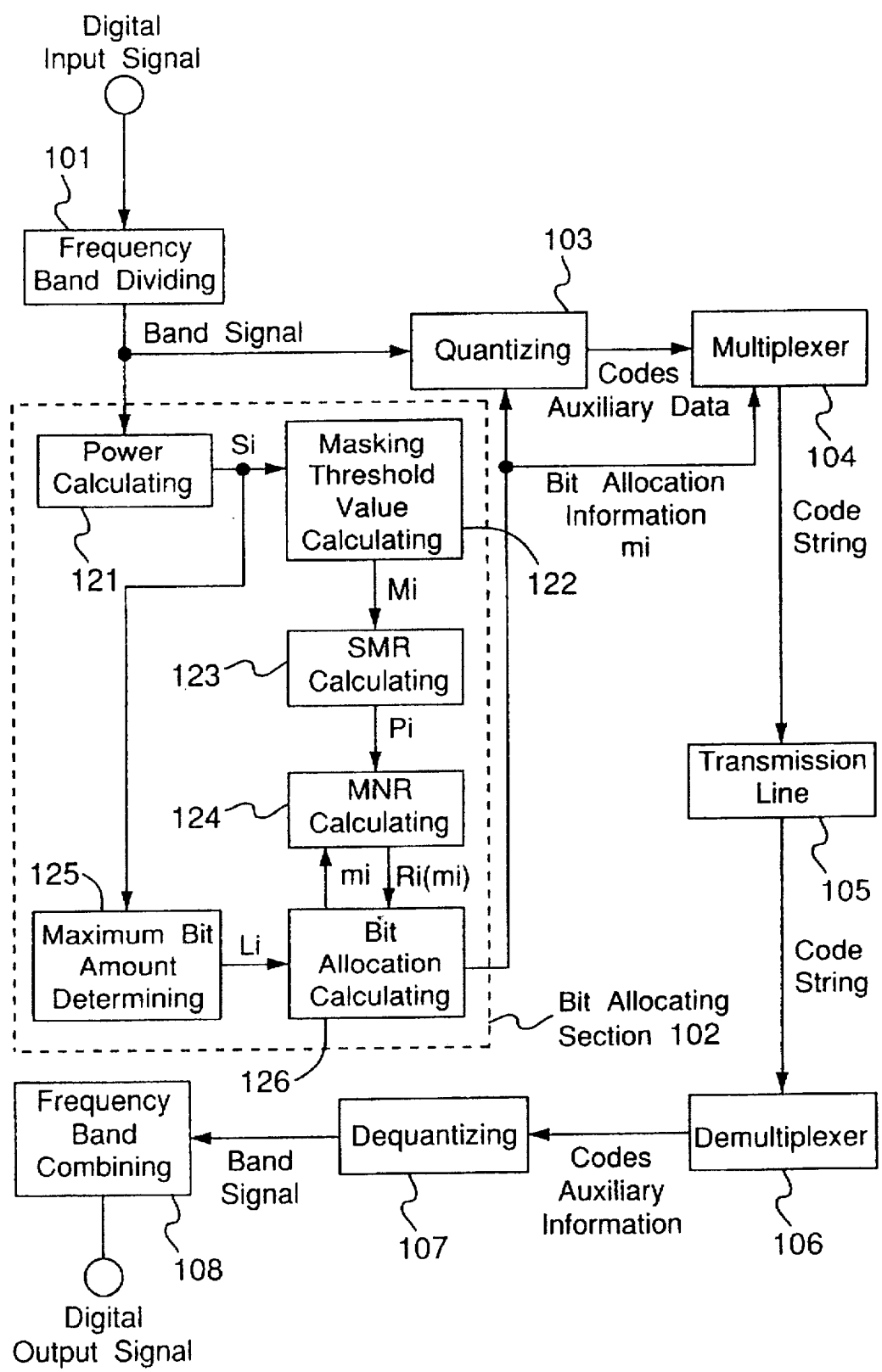
FIG. 4 is a block diagram of an encoding and decoding apparatus according to a second embodiment of the present invention.

FIG. 4 shows a block diagram of an encoding and decoding apparatus according to a second embodiment.

The present encoding and decoding apparatus includes: an encoding section comprised of a frequency band dividing section 101, a bit allocating section 102, a quantizing section 103, and a multiplexer 104; a transmission line 105; and a decoding section comprised of a demultiplexer 106, a dequantizing section 107, and a frequency band combining section 108. The bit allocating section 102 includes a power calculating section 121, a masking threshold value calculating section 122, an SMR (signal-to-masking threshold value ratio) calculating section 123, an MNR (masking threshold value-to-noise ratio) calculating section 124, a maximum bit amount determining section 125, and a bit allocation calculating section 126. The transmission line 105 is comprised of a wireless system, a wired system, or a storage system.

For convenience in description, an operation of the entire encoding and decoding apparatus will be described first, and thereafter an operation of the bit allocating section 102 will be described.

In the present embodiment, it is assumed that processing operations such as bit allocation, quantization, and coding are executed in the unit of a time (frame) of several milliseconds to several tens milliseconds in each component.

A digital input signal is divided into a plurality of frequency bands in the frequency band dividing section 101. As a dividing system, there is a frequency conversion system such as Fourier transformation, a band pass filter bank and the like. When a frequency conversion system is adopted, the frequency band is assumed to be composed of a plurality of frequency components obtained through a conversion process.

A frequency band signal is inputted to the bit allocating section 102 and the quantizing section 103. The bit allocating section 102 obtains a quantization bit amount from the frequency band signal in a manner as described hereinafter, and transmits the obtained information to the quantizing section 103. The quantizing section 103 quantizes the frequency band signal based on the information to convert the signal into codes.

The thus obtained codes and side information such as bit allocation information (the side information are necessary for decoding the codes in the decoding section and depends on the quantizing and coding systems) of each frequency band signal are multiplexed in the multiplexer 104, and then transmitted as a code string to the transmission line 105.

The demultiplexer 106 of the decoding section takes in the code string from the transmission line 105, and separates the same into the codes and side information such as the bit allocation information of each frequency band signal. Then the codes of each frequency band signal are decoded by means of the side information, and then dequantized in the dequantizing section 107 based on the side information such as the bit allocation information to be restored into the frequency band signal. The signal is combined in the frequency band combining section 108 to be formed into a digital output signal.

Then the operation of the bit allocating section 102 of the encoding section will now be described in detail.

As to the digital input signal, a power Si of each frequency band within a frame is obtained in the power calculating section 121, and then a masking threshold value Mi of each frequency band is obtained according to a known means based on the power Si in the masking threshold value calculating section 122. It is herein assumed that i represents an index (an integer not smaller than 0) for discriminating the frequency band. In the power calculating section 121, a total band power Sp (=ΣSi) is further obtained. Then in the SMR calculating section 123, a signal-to-masking threshold value ratio (SMR) Pi of each frequency band is obtained according to the following equation:

$$Pi = Si/Mi \qquad (101)$$

where the square of the maximum amplitude value in the signal band of a frequency band i may be used instead of Si. Then in the MNR calculating section 124, a masking threshold value-to-noise ratio (MNR) Ri(m) of each frequency band is obtained. The bit allocation calculating section 126 determines the quantization bit amount m of each frequency band using the masking threshold value-to-noise ratio (MNR) Ri(m) obtained in the MNR calculating section 124. The masking threshold value-to-noise ratio (MNR) Ri(m) is obtained according to the following equation:

$$Ri(m) = Q(m)/Pi \qquad (102)$$

where Q(m) is a signal-to-quantization noise power ratio (SNR) Q(m) in the case where a frequency band is quantized in m bits. Although the ratio Q(m) can be calculated according to Si/N(m), the ratio can be preparatorily obtained through a statistical process taking advantage of the signal characteristics. N(m) is a quantization noise power in the case where the quantization is effected in m bits. The maximum bit amount determining section 125 compares the power Si of each frequency band with the total band power Sp to determine the maximum amount of bits allocatable to each frequency band.

Figure 5:
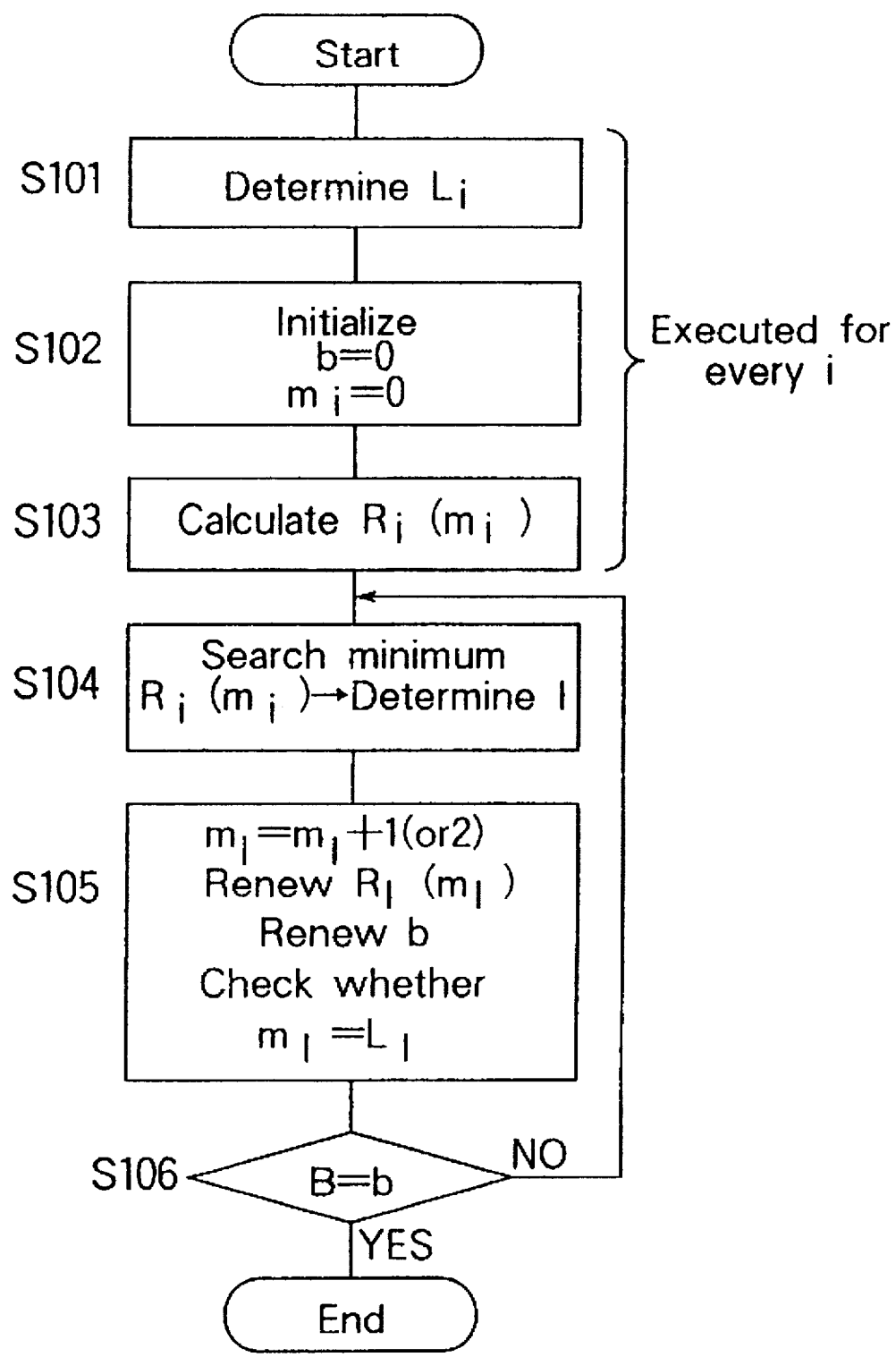
FIG. 5 is a flowchart of a procedure of allocating bits by means of the encoding and decoding apparatus of the second embodiment.

The bit allocation calculating section 126 and the maximum bit amount determining section 125 determine the quantization bit amount m of each frequency band practically according to a flowchart as shown in FIG. 5. It is herein assumed that the total amount of bits allocatable in quantizing and coding the signal of each frequency band is B and the maximum amount of bits allocatable to each frequency band is Li.

First at S101, the maximum bit amount determining section 125 determines the maximum amount Li of bits allocatable to each frequency band based on the power Si of each frequency band according to a determination method as described hereinafter. Then at S102, the bit allocation calculating section 126 is initialized. In detail, a number of 0 is entered into a variable b representing the total amount of allocated bits up to the present time. The quantization bit amount of each frequency band is determined to be mji, and a number of 0 is entered into mji. Then at S103, Ri(mi) is calculated according to Equation (102). Then at S104, the minimum Ri(mi) is searched (the index i of the frequency band at the above-mentioned time is determined to be I). Then at S105, a number of 1 (or the minimum quantization bit amount (normally 2) when $m_I$ is 0) is added to $m_I$. It is checked whether a relationship of $m_I = L_I$ holds as a result. When $m_I = L_I$, subsequently the frequency band I is excluded from the objects to be searched in the process of S104. Further, $R_I(m_I)$ is renewed according to Equation (102) in the MNR calculating section 124. Meanwhile, the same number as the amount of bits allocated to the present frequency band I is added to the variable b. In other words, (the amount of objective signals to be quantized included in the frequency band I)×1 (or the minimum quantization bit amount 2 when $m_I$ is 0) is added to the variable b. Then at S106, it is checked whether the variable b coincides with the total amount B of the allocatable quantization bits. If they do not coincide with each other, the program flow returns to S104 to continue the bit allocating operation. When they coincide with each other, the bit allocating operation is completed.

The maximum bit amount determining section 125 determines the maximum amount Li of bits allocatable to each frequency band based on the magnitude of the power Si of each frequency band according to any of the following determination methods.

Figure 6:
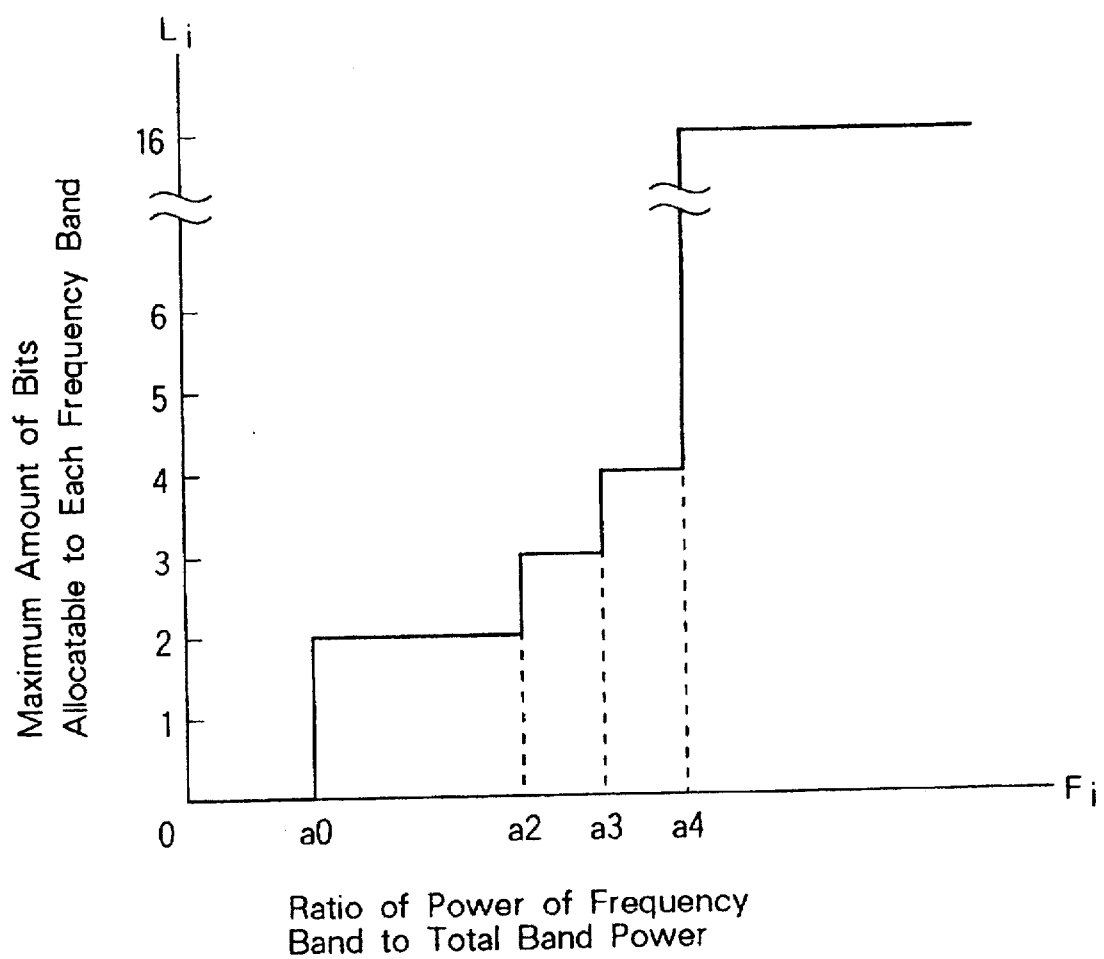
FIG. 6 is a graph for explaining a method of determining a maximum bit number in a maximum bit number determining section of the encoding and decoding apparatus of the second embodiment.

According to a first determination method, the maximum amount Li of bits allocatable to each frequency band is obtained from a ratio Fi of the power Si of the frequency band i to the total band power Sp previously obtained in the power calculating section 121. Namely, the following equation:

$$Fi = Si/Sp$$

is obtained, and the maximum bit amount Li is determined so that the smaller Fi is, the smaller the maximum bit amount Li of each frequency band is. FIG. 6 shows an exemplified relationship of a correspondence between Fi and Li. In FIG. 6, the number of 16 of Li in the axis of ordinates is originally the maximum bit amount in quantization. Meanwhile, a0, a2, a3, and a4 of Fi in the axis of abscissas are the threshold values of 0 bit, 2 bits, 3 bits, and 4 bits of the maximum bit amount Li, where each of the threshold values takes a value of from 0 to 1. According as the threshold values a0, a2, a3, and a4 are getting closer to 1, a more severe limitation is imposed. By selecting a value closer to 0 as the value of a0, no bit allocation is required for an error signal generated in the division calculation process in the frequency band dividing section 101, and bits can be allocated to a normal weak signal (though there is an upper limit). The present determination method produces a great effect of limiting the bit allocation to the frequency band having a small power Si when the input signal is great. However, when the input signal is small and the total power Sp itself is small, almost all the Fi values become greater than the threshold values a0, a2, a3, and a4, and therefore the bit allocation is possibly not limited substantially.

According to a second determination method, the maximum amount Li of bits allocatable to each frequency band is obtained by the power Si itself. In the present case, the relationship of correspondence between Si and Li is obtained by replacing Fi in the axis of abscissas with Si in FIG. 6. The units of the threshold values a0, a2, a3, and a4 are also the same as those of Si. The present determination method produces a great effect of limiting the bit allocation to the frequency band having a small power Si when the input signal is small. However, when the input signal is great, almost all the Si values become greater than the threshold values a0, a2, a3, and a4, and therefore the bit allocation is possibly not limited substantially.

Therefore, according to a third determination method, the maximum amount Li of bits allocatable to each frequency band is determined by combining the first and second determination methods. In detail, firstly Li is determined according to the first determination method (the method according to Fi) in a frequency band i. If any limited value (a number not greater than 4 in the example of FIG. 6) is not entered in Li, the Li is determined according to the second determination method (the method according to Si). With the above-mentioned arrangement, the bit allocation to the frequency band having a small power Si can be effectively limited regardless of the magnitude of the input signal. It is to be noted that the second determination method (the method according to Si) can be executed first, and the first determination method (the method according to Fi) can be executed thereafter.

According to the present encoding and decoding apparatus as described above, the maximum amount Li of bits allocatable to a frequency band having a small power Si (the frequency band assumed to be $I_2$ for convenience) located apart from a frequency band having a great power Si (the frequency band assumed to be $I_1$ for convenience) among a plurality of frequency bands can be limited regardless of the magnitude of the masking threshold value-to-noise ratio (MNR) Ri(m). Therefore, when a sine-wave signal is inputted, the maximum bit amount of the frequency band $I_2$ having a small power located apart from the frequency band $I_1$ including the sine-wave signal can be effectively limited. In other words, when the masking threshold value-to-noise ratio (MNR) obtained in the MNR calculating section 124 is on the same level, bits exceeding in amount of the limited maximum bit amount Li are not allocated to the frequency band $I_2$ having a small power. As a result, the bits which would have been allocated to the frequency band $I_2$ having a small power are allocated to another frequency band, in particular, to the frequency band $I_1$ including the sine-wave signal. Therefore, the quantization noise can be reduced in comparison with the conventional case when the sine-wave signal is decoded to allow the sound quality to be improved.

If the limitation in the maximum bit amount determining section 125 is severe in the above place, the bit allocation is possibly finished with the masking threshold value-to-noise ratio (MNR) $R_I(m_I)$ smaller than 1 in the frequency band having a small power Si. In the present case, it is apprehended that the quantization noise may be perceived in the frequency band.

Figure 7:
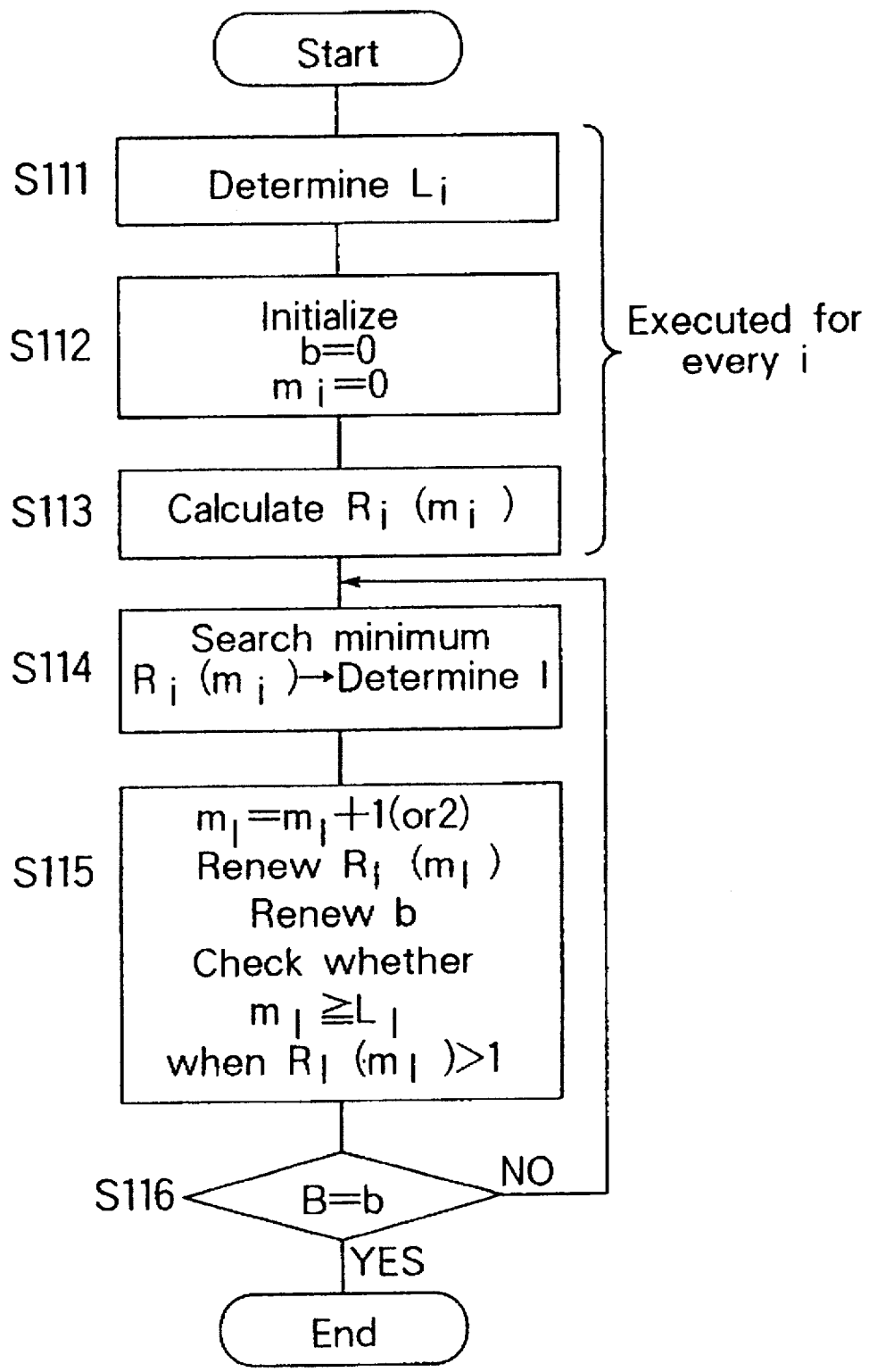
FIG. 7 is a flowchart of another procedure of allocating bits by means of the encoding and decoding apparatus of the second embodiment.

In view of the above, the bit allocation calculating section 126 and the maximum bit amount determining section 125 may determine the quantization bit amount m of each frequency band according to a flowchart as shown in FIG. 7. In detail, after the processing is proceeded at S111 to S114 in the same manner as in S101 to S104 shown in FIG. 5, it is checked whether $R_I(m_I)$ has exceeded 1 in the bit allocation calculating section 126 at S115. When $R_I(m_I) \leq 1$, the $m_I$ is made to be not limited by $L_I$ in the bit allocating process. When $R_I(m_I) > 1$, a comparison in magnitude is executed between $m_I$ and $L_I$. When $m_I \leq L_I$, subsequently the aforementioned frequency band I is excluded from the object to be searched at S114. Further, $R_I(m_I)$ is renewed according to Equation (102) in the MNR calculating section 124. Meanwhile, the same number as the amount of bits allocated to the present frequency band I is added to the variable b. Then at S116, it is checked whether the variable b coincides with the total amount B of the allocatable quantization bits. If they do not coincide with each other, the program flow returns to S114 to continue the bit allocating operation. When they coincide with each other, the bit allocating operation is completed.

With the above-mentioned arrangement, the bit allocating operation is effected up to a time when the masking threshold value-to-noise ratio exceeds 1 in the frequency band of which maximum bit amount is limited. At a point of time when the masking threshold value exceeds 1, the bit allocating operation is immediately stopped. In other words, the maximum bit amount can be limited while allowing the elimination of the possibility that the bit allocating operation is finished with the masking threshold value-to-noise ratio (MNR) $R_I(m_I)$ smaller than 1. Therefore, the quantization noise in the frequency band $I_1$ including the sine-wave signal can be reduced, and further the quantization noise in the frequency band $I_2$ having a small power can be reduced. Therefore, the sound quality in the decoding stage can be improved.

When the limitation in the maximum bit amount determining section 125 is severe, it is possible that a relationship of b<B holds regardless of the fact that the bit amount of every frequency band is equal to (or exceeding) Li. In other words, since the maximum bit amount Li of each frequency band is small, there may be remaining allocatable bits.

Figure 8:
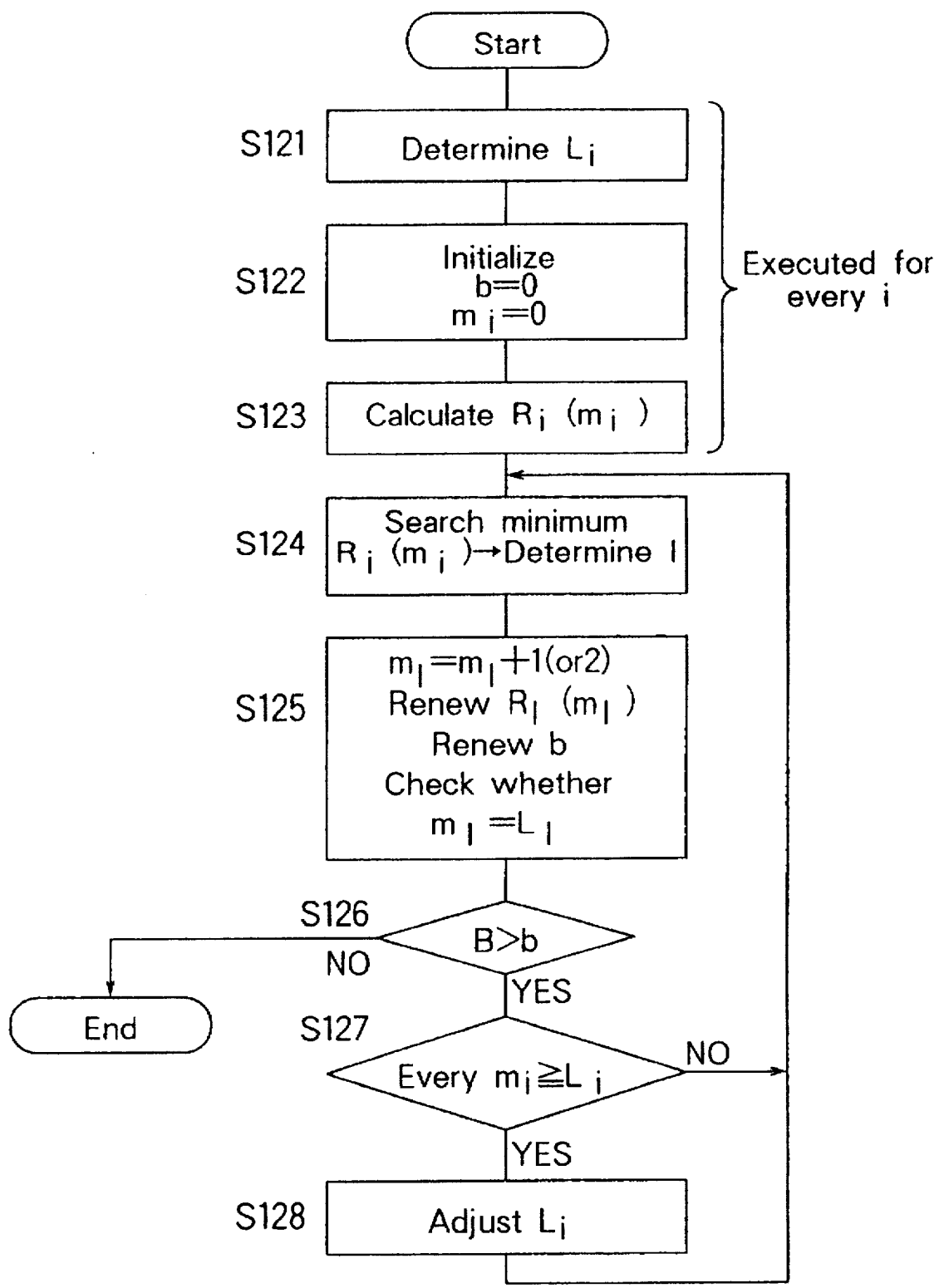
FIG. 8 is a flowchart of yet another procedure of allocating bits by means of the encoding and decoding apparatus of the second embodiment.

In view of the above, the bit allocation calculating section 126 and the maximum bit amount determining section 125 may determine the quantization bit amount m of each frequency band according to a flowchart as shown in FIG. 8. In detail, after the processing is proceeded at S121 to S125 in the same manner as in S101 to S105 shown in FIG. 5, a comparison is executed in magnitude between b and B at S126. When B>b, it is checked whether the bit amount mi of every frequency band is equal to (or exceeding) Li at S127. When a condition in which the bit amount mi is equal to (or exceeding) Li in every frequency band occurs, Li is increased by alleviating the limitation in the maximum bit amount determining section 125 at S128. When mi<Li in a specified frequency band, the magnitude of Li is kept intact, and the program flow returns to S124. When the processing operation is continued and the variable b coincides with the total amount B of the allocatable quantization bits, the bit allocating operation is completed.

When there are remaining allocatable bits after completing one round of the bit allocating operation, Li is increased and the bit allocating operation is executed again. Therefore, the bit allocation can be effectively achieved within a range of the total amount B of the quantization bits. Since some extra bits are allocated to the frequency band $I_2$ having a small power to which is allocated bits smaller in amount than is properly required due to the aforementioned limitation, the masking threshold value-to-noise ratio (MNR) in the frequency band $I_2$ can be improved to allow the sound quality in the decoding stage to be improved. It is to be noted that S125 may be S115 shown in FIG. 7.

Figure 9:
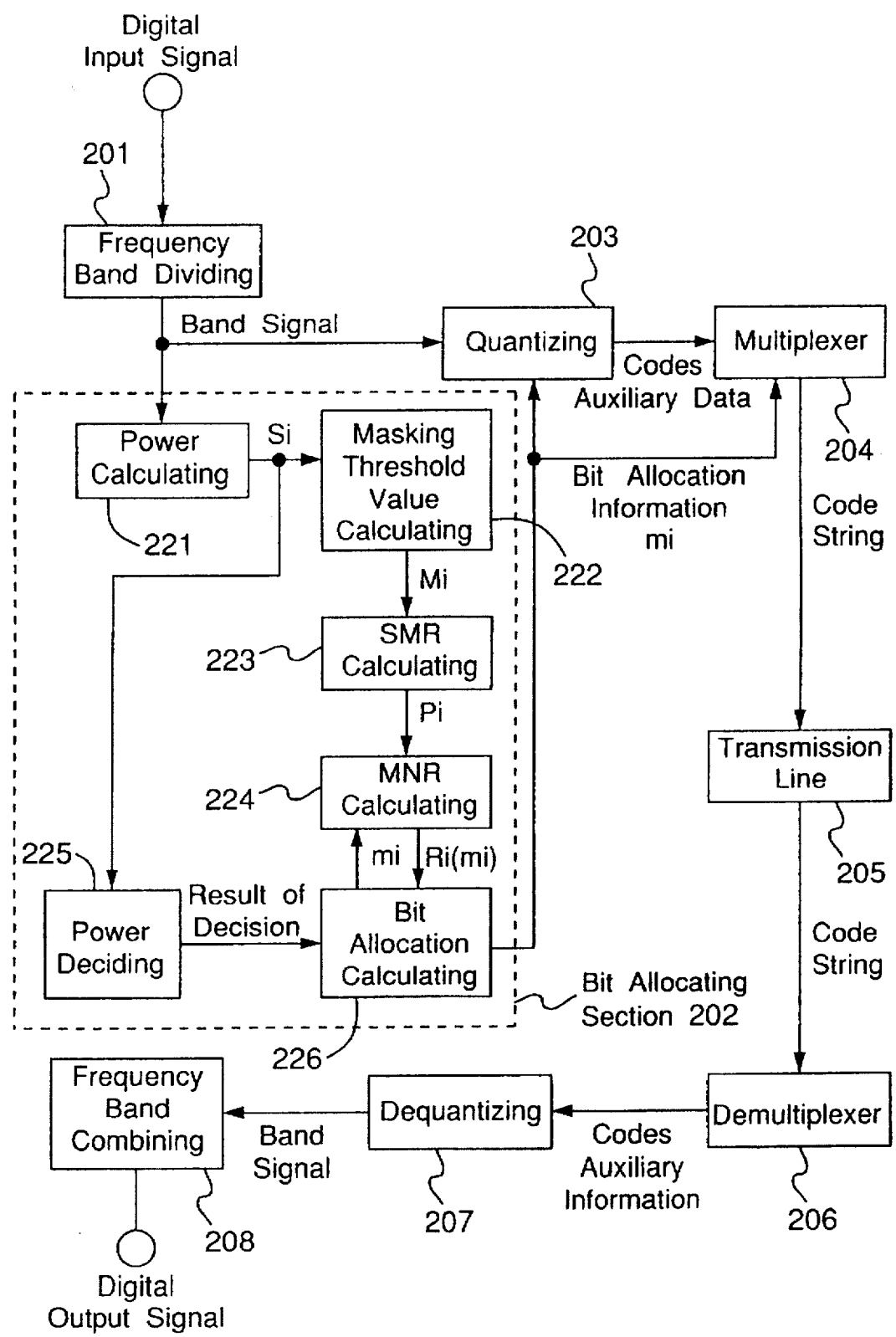
FIG. 9 is a block diagram of an encoding and decoding apparatus according to a third embodiment of the present invention.

FIG. 9 shows a block diagram of an encoding and decoding apparatus according to a third embodiment.

The present encoding and decoding apparatus includes: an encoding section comprised of a frequency band dividing section 201, a bit allocating section 202, a quantizing section 203, and a multiplexer 204; a transmission line 205; and a decoding section comprised of a demultiplexer 206, a dequantizing section 207, and a frequency band combining section 208. The bit allocating section 202 includes a power calculating section 221, a masking threshold value calculating section 222, an SMR (signal-to-masking threshold value ratio) calculating section 223, an MNR (masking threshold value-to-noise ratio) calculating section 224, a power deciding section 225, and a bit allocation calculating section 226. The transmission line 205 is comprised of a wireless system, a wired system, or a storage system.

For convenience in description, an operation of the entire encoding and decoding apparatus will be described first, and thereafter an operation of the bit allocating section 202 will be described.

In the present embodiment, it is assumed that processing operations such as bit allocation, quantization, and coding are executed in the unit of a time (frame) of several milliseconds to several tens milliseconds in each component.

A digital input signal is divided into a plurality of frequency bands in the frequency band dividing section 201. As a dividing system, there is a frequency conversion system such as Fourier transformation and a band pass filter bank. When a frequency conversion system is adopted, the frequency band is assumed to be composed of a plurality of frequency components obtained through a conversion process.

A frequency band signal is inputted to the bit allocating section 202 and the quantizing section 203. The bit allocating section 202 obtains a quantization bit amount from the frequency band signal in a manner as described hereinafter, and transmits the obtained information to the quantizing section 203. The quantizing section 203 quantizes the frequency band signal based on the information to convert the signal into codes.

The thus obtained codes and side information such as bit allocation information (the side information are necessary for decoding the codes in the decoding section and depends on the quantizing and coding systems) of each frequency band signal are multiplexed in the multiplexer 204, and then transmitted as a code string to the transmission line 205.

The demultiplexer 206 of the decoding section takes in the code string from the transmission line 205, and separates the same into the codes and side information such as the bit allocation information of each frequency band signal. Then the codes of each frequency band signal are decoded by means of the side information, and then dequantized in the dequantizing section 207 based on the side information such as the bit allocation information to be restored into the frequency band signal. The signal is combined in the frequency band combining section 208 to be formed into a digital output signal.

Then the operation of the bit allocating section 202 of the encoding section will now be described in detail.

With respect to the digital input signal, a power Si of each frequency band within a frame is obtained in the power calculating section 221, and then a masking threshold value Mi of each frequency band is obtained according to a known means based on the power Si in the masking threshold value calculating section 222. It is herein assumed that i represents an index (an integer not smaller than 0) for discriminating the frequency band. In the power calculating section 221, a total band power Sp ($=\Sigma Si$) is further obtained. Then in the SMR calculating section 223, a signal-to-masking threshold value ratio (SMR) Pi of each frequency band is obtained according to the following equation:

$$Pi=Si/Mi \qquad (201)$$

where the square of the maximum amplitude value in the signal band of a frequency band i may be used instead of Si. Then in the MNR calculating section 224, a masking threshold value-to-noise ratio (MNR) Ri(m) of each frequency band is obtained. The bit allocation calculating section 226 determines the quantization bit amount m of each frequency band using the masking threshold value-to-noise ratio (MNR) Ri(m) obtained in the MNR calculating section 224. The masking threshold value-to-noise ratio (MNR) Ri(m) is obtained according to the following equation:

$$Ri(m)=Q(m)/Pi \qquad (202)$$

where Q(m) is a signal-to-quantization noise power ratio (SNR) Q(m) in the case where a frequency band is quantized in m bits. Although the ratio Q(m) can be calculated according to Si/N(m), the ratio can be preparatorily obtained through a statistical process taking advantage of the signal characteristics. N(m) is a quantization noise power in the case where the quantization is effected in m bits. The power deciding section 225 compares the power Si of each frequency band with the total band power Sp, and when the section decides that the power Si of each frequency band is greater than a specified threshold value, the section surely allocates bits to the frequency band.

Figure 10:
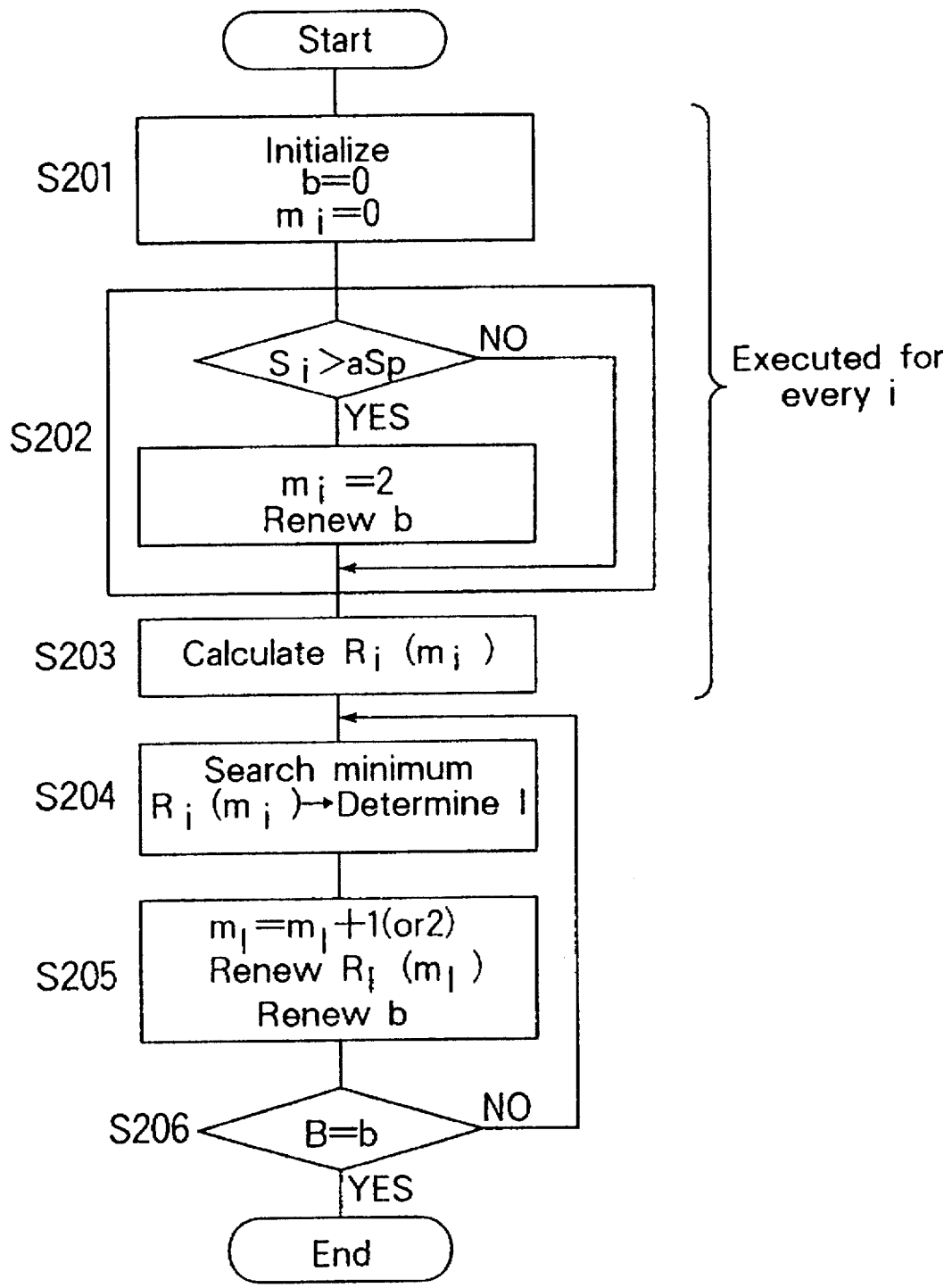
FIG. 10 is a flowchart of a procedure of allocating bits by means of the encoding and decoding apparatus of the third embodiment.

The bit allocation calculating section 226 and the power deciding section 225 determine the quantization bit amount m of each frequency band practically according to a flowchart as shown in FIG. 10. It is herein assumed that the total amount of bits allocatable in quantizing and coding the signal of each frequency band is B.

First at S201, the bit allocation calculating section 226 is initialized. In detail, a number of 0 is entered into a variable b representing the total amount of allocated bits up to the present time. The quantization bit amount of each frequency band is determined to be mi, and a number of 0 is entered into mi. Then at S202, the power deciding section 225 allocates a minimum quantization bit amount (normally 2) to mi in regard to the frequency band i in which the following relationship:

$$Si > aSp$$

(where a is a constant satisfying 0<a<1)
holds. Namely, mi is made to be mi=2. The above-mentioned inequality is to inspect how much degree the power Si of a specified frequency band is relative to the total band power Sp, where a is a constant representing the degree of the power. To a frequency band having a power Si which is judged to be great using the inequality are surely allocated bits regardless of the magnitude of the masking threshold value-to-noise ratio (MNR). Then the same number as the amount of bits allocated to the present frequency band i is added to the variable b. In other words, (the amount of objective signals to be quantized included in the frequency band i)×2 bits is added to the variable b. The two bits mean the minimum quantization bit amount. Then at S203, Ri(mi) is calculated according to Equation (202) in the MNR calculating section 224. Then at S204, a minimum Ri(mi) is searched (the index i of the frequency band at the above-mentioned time is determined to be I). At S205, a number of 1 (or the minimum quantization bit amount (normally 2) when $m_I$ is 0) is added to $m_I$. Then, $R_I(m_I)$ at the above-mentioned time is renewed according to Equation (202) in the MNR calculating section 224. Meanwhile, the same number as the amount of bits allocated to the present frequency band I is added to the variable b. In other words, (the amount of objective signals to be quantized included in the frequency band I)×1 (or the minimum quantization bit amount 2 when $m_I$ is 0) is added to the variable b. Then at S206, it is checked whether the variable b coincides with the total amount B of the allocatable quantization bits. If they do not coincide with each other, the program flow returns to S204 to continue the bit allocating operation. When they coincide with each other, the bit allocating operation is completed.

According to the present encoding and decoding apparatus as described above, the ratio of the power Si of each frequency band to the total band power Sp is decided by the power deciding section 225, and according to the result of the decision, at least the minimum amount of quantization bits are allocated to the frequency band (assumed to be $I_4$ for convenience) having a power Si not smaller than a specified ratio a to surely allocate bits thereto. In other words, the frequency band $I_4$ having a power Si not smaller than the specified ratio a is not completely deleted due to the influence of the power of another frequency band (assumed to be $I_3$ for convenience). Therefore, unlike the conventional case, no sense of incongruity is given to a person who is excellent in auditory sense to allow a high-quality reproduction sound to be provided.

Figure 11:
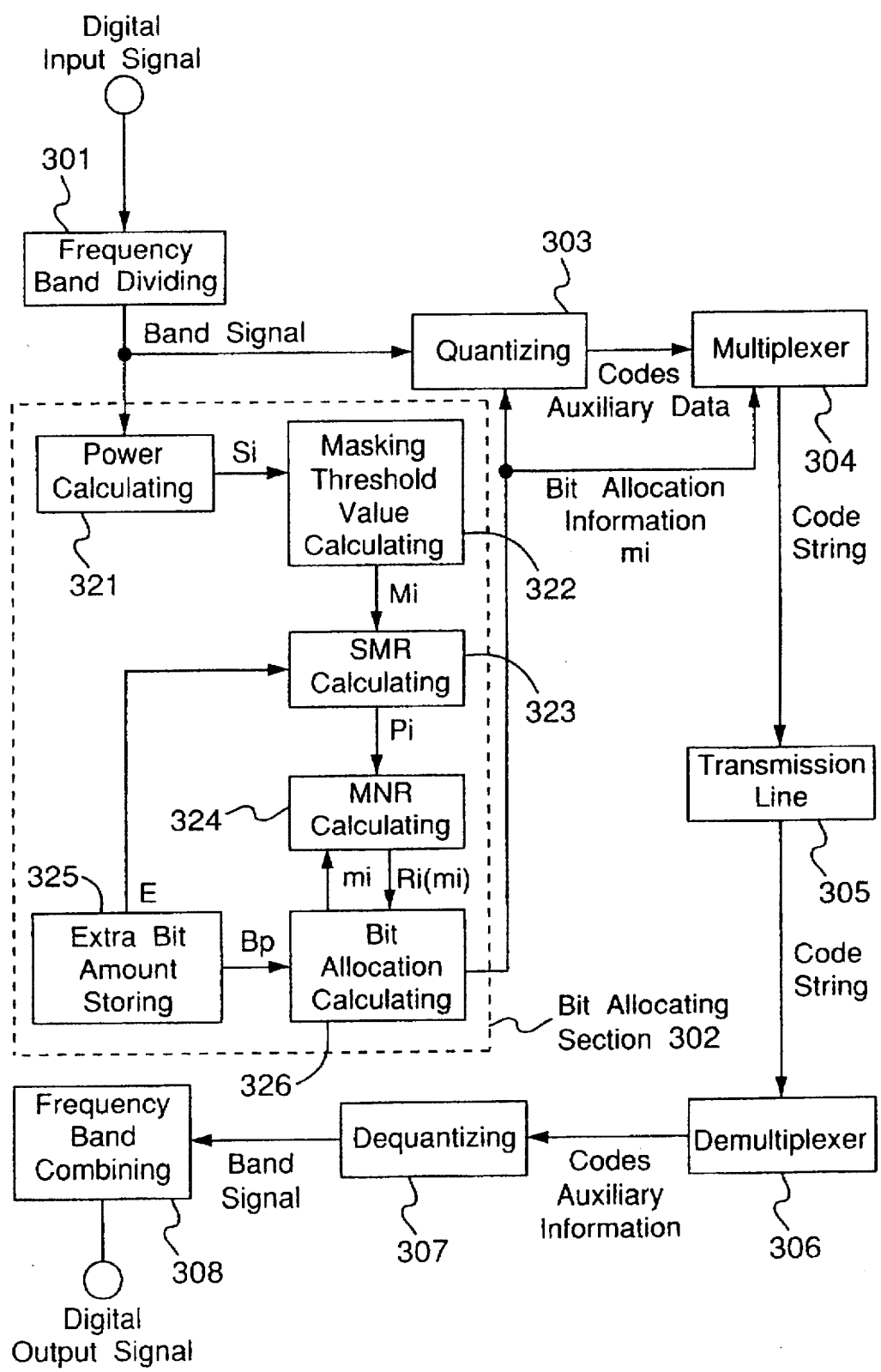
FIG. 11 is a block diagram of an encoding and decoding apparatus according to a fourth embodiment of the present invention.

FIG. 11 shows a block diagram of an encoding and decoding apparatus according to a fourth embodiment.

The present encoding and decoding apparatus includes: an encoding section comprised of a frequency band dividing section 301, a bit allocating section 302, a quantizing section 303, and a multiplexer 304; a transmission line 305; and a decoding section comprised of a demultiplexer 306, a dequantizing section 307, and a frequency band combining section 308. The bit allocating section 302 includes a power calculating section 321, a masking threshold value calculating section 322, an SMR (signal-to-masking threshold value ratio) calculating section 323, an MNR (masking threshold value-to-noise ratio) calculating section 324, an extra bit amount storing section 325, and a bit allocation calculating section 326. The transmission line 305 is comprised of a wireless system, a wired system, or a storage system.

For convenience in description, an operation of the entire encoding and decoding apparatus will be described first, and thereafter an operation of the bit allocating section 302 will be described.

In the present embodiment, it is assumed that processing operations such as bit allocation, quantization, and coding are executed in the unit of a time (frame) of several milliseconds to several tens milliseconds in each component.

A digital input signal is divided into a plurality of frequency bands in the frequency band dividing section 301. As a dividing system, there is a frequency conversion system such as Fourier transformation and a band pass filter bank. When a frequency conversion system is adopted, the frequency band is assumed to be composed of a plurality of frequency components obtained through a conversion process.

A frequency band signal is inputted to the bit allocating section 302 and the quantizing section 303. The bit allocating section 302 obtains a quantization bit amount from the frequency band signal in a manner as described hereinafter, and transmits the obtained information to the quantizing section 303. The quantizing section 303 quantizes the frequency band signal based on the information to convert the signal into codes. The thus obtained codes and side information such as bit allocation information (the side information are necessary for decoding the codes in the decoding section and depends on the quantizing and coding systems) of each frequency band signal are multiplexed in the multiplexer 304, and then transmitted as a code string to the transmission line 305.

The demultiplexer 306 of the decoding section takes in the code string from the transmission line 305, and separates the same into the codes and side information such as the bit allocation information of each frequency band signal. Then the codes of each frequency band signal are decoded by means of the side information, and then dequantized in the dequantizing section 307 based on the side information such as the bit allocation information to be restored into the frequency band signal. The signal is combined in the frequency band combining section 308 to be formed into a digital output signal. Subsequently, a specified frequency band is to be emphasized by E [dB] at maximum in a reproducing apparatus (not shown).

Then the operation of the bit allocating section 302 of the encoding section will now be described in detail.

With regard to the digital input signal, a power Si of each frequency band within a frame is obtained in the power calculating section 321, and then a masking threshold value Mi of each frequency band is obtained according to a known means based on the power Si in the masking threshold value calculating section 322. It is herein assumed that i represents an index (an integer not smaller than 0) for discriminating the frequency band. In the power calculating section 321, a total band power Sp (=ΣSi) is further obtained. Then in the SMR calculating section 323, a signal-to-masking threshold value ratio (SMR) Pi of each frequency band is obtained according to the following equation:

$$Pi = Si/Mi \qquad (301)$$

where the square of the maximum amplitude value in the signal band of a frequency band i may be used instead of Si.

Then in the MNR calculating section 324, a masking threshold value-to-noise ratio (MNR) Ri(m) of each frequency band is obtained. The bit allocation calculating section 326 determines the quantization bit amount m of each frequency band using the masking threshold value-to-noise ratio (MNR) Ri(m) obtained in the MNR calculating section 324. The masking threshold value-to-noise ratio (MNR) Ri(m) is obtained according to the following equation:

$$Ri(m) = Q(m)/Pi \qquad (302)$$

where Q(m) is a signal-to-quantization noise power ratio (SNR) Q(m) in the case where a frequency band is quantized in m bits. Although the ratio Q(m) can be calculated according to Si/N(m), the ratio can be preparatorily obtained by a statistical process taking advantage of the signal characteristics. N(m) is a quantization noise power in the case where the quantization is effected in m bits. For instance, when the quantization noises are distributed constantly in the quantization size, the following equation:

$$Q(m) = 6m \; [dB] \qquad (303)$$

can hold. N(m) is a quantization noise power in the case where the quantization is effected in m bits. The extra bit amount storing section 325 preparatorily stores a bit amount Bp, and at a point of time when the bit allocating operation in the bit allocation calculating section 326 is completed, the bit amount Bp is added to the bit amount of a specified frequency band Is to be emphasized. The bit amount Bp is made to have a value sufficient for suppressing the increase of the quantization noises which would increase by emphasizing the specified frequency band Is. For instance, it is now assumed that the signal-to-quantization noise power ratio (SNR) Q(m)=6 [dB] provided by Equation (303) is used. When an emphasis is effected by E [dB] at maximum, the minimum integer closest or equal to E/6 is determined to be Bp.

Figure 12:
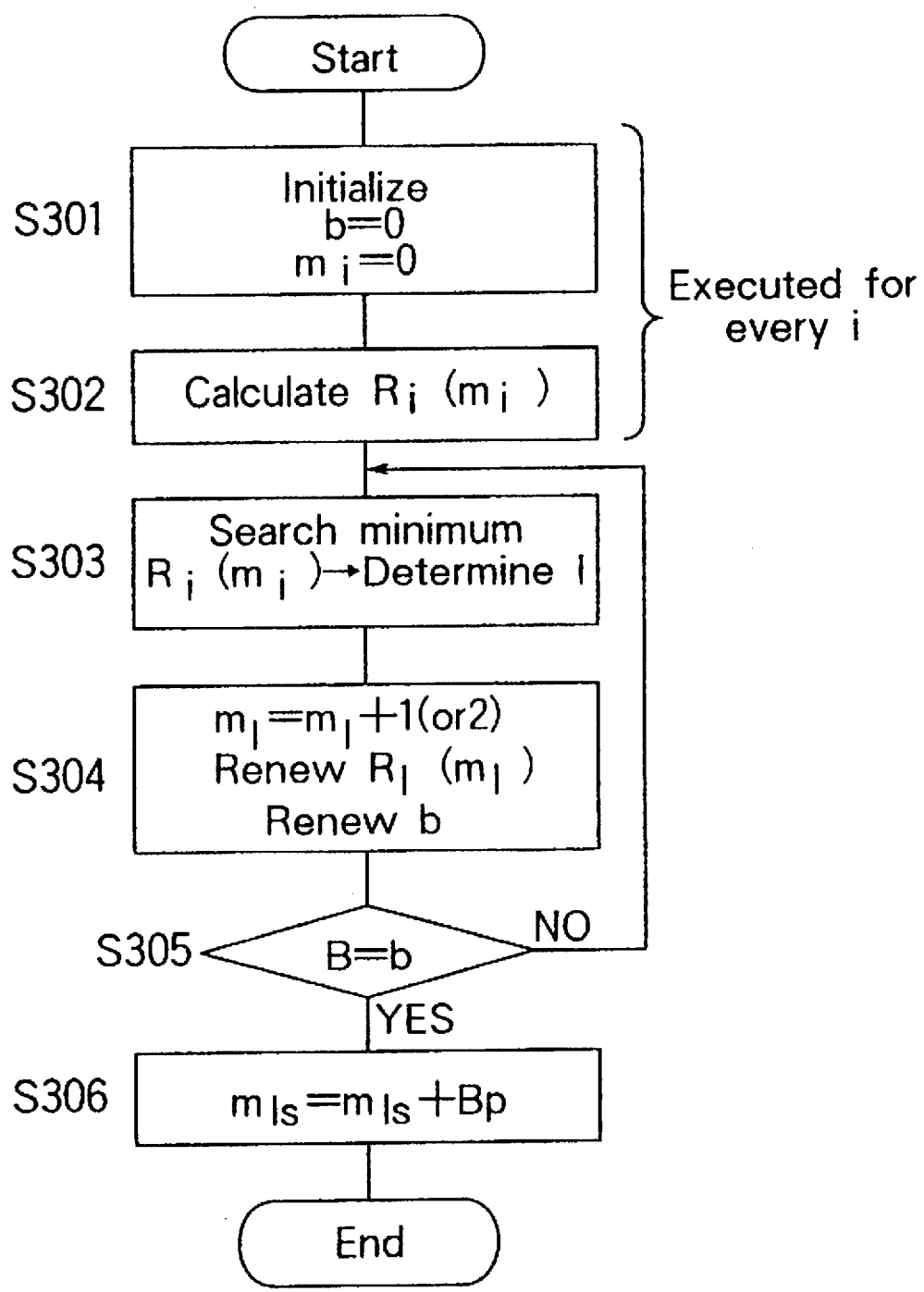
FIG. 12 is a flowchart of a procedure of allocating bits by means of the encoding and decoding apparatus of the fourth embodiment.

The bit allocation calculating section 326 and the extra bit amount storing section 325 determine the quantization bit amount m of each frequency band practically according to a flowchart as shown in FIG. 12. It is herein assumed that the total amount of bits allocatable in quantizing and coding the signal of each frequency band is B. In detail, the total bit amount B is determined by excluding a value of (the bit amount Bp stored in the extra bit amount storing section 325)×(the amount of objective signals to be quantized included in the frequency band Is) from the total original bit amount.

First at S301, the bit allocation calculating section 326 is initialized. In detail, a number of 0 is entered into a variable b representing the total amount of allocated bits up to the present time. The quantization bit amount of each frequency band is determined to be mi, and a number of 0 is entered into mi. Then at S302, Ri(mi) is calculated according to Equation (302). Then at S324, a minimum Ri(mi) is searched (the index i of the frequency band at the above-mentioned time is determined to be I). Then at S304, a number of 1 (or the minimum quantization bit amount (normally 2) when $m_I$ is 0) is added to $m_I$. Then, $R_I(m_I)$ is renewed according to Equation (302) in the MNR calculating section 324. Meanwhile, the same number as the amount of bits allocated to the present frequency band I is added to the variable b. In other words, (the amount of objective signals to be quantized included in the frequency band I)×1 (or the minimum quantization bit amount 2 when $m_I$ is 0) is added to the variable b. Then at S305, it is checked whether the variable b coincides with the total amount B of the allocatable quantization bits. If they do not coincide with each other, the program flow returns to S303 to continue the bit allocating operation. When they coincide with each other, the program flow proceeds to S306. At S306, the bit amount Bp stored in the extra bit amount storing section 325 is added to the bit amount $m_{Is}$ of the specified frequency band Is. In other words, extra bits are allocated to the specified frequency band Is, and the bit allocating operation is completed.

According to the present encoding and decoding apparatus as described above, the extra bits Bp stored in the extra bit amount storing section 325 are allocated to the specified frequency band Is to be emphasized, and therefore the quantization noise in the frequency band Is is reduced in correspondence with the allocated extra amount of bits. Conversely, the magnitude of the quantization noise in the frequency band Is after being emphasized in the reproduction stage does not exceed the magnitude of the quantization noise taking place in the case where the bits are allocated normally without the emphasizing operation in the reproduction stage. The above is because the Bp is set at an integer value closest or equal to E/6 when the emphasis is executed by E [dB] at maximum. As a result, the quantization noise is prevented from exceeding the masking threshold value to allow the quantization noise to be prevented from being perceived.

It is to be noted that the frequency band to be emphasized, i.e., the frequency band Is to which extra bits are to be allocated is of course not limited in amount to one, and there may be a plurality of frequency bands to be emphasized.

In the aforementioned example, bits are surely allocated to the frequency band Is to be emphasized even when no signal component is included in the frequency band Is. When the signal itself or the quantization noise of the frequency band Is is masked by the signal of another frequency band even when the frequency band Is is emphasized, bits are surely allocated to the frequency band Is. Therefore, a futility may take place in the bit allocation process.

Figure 13:
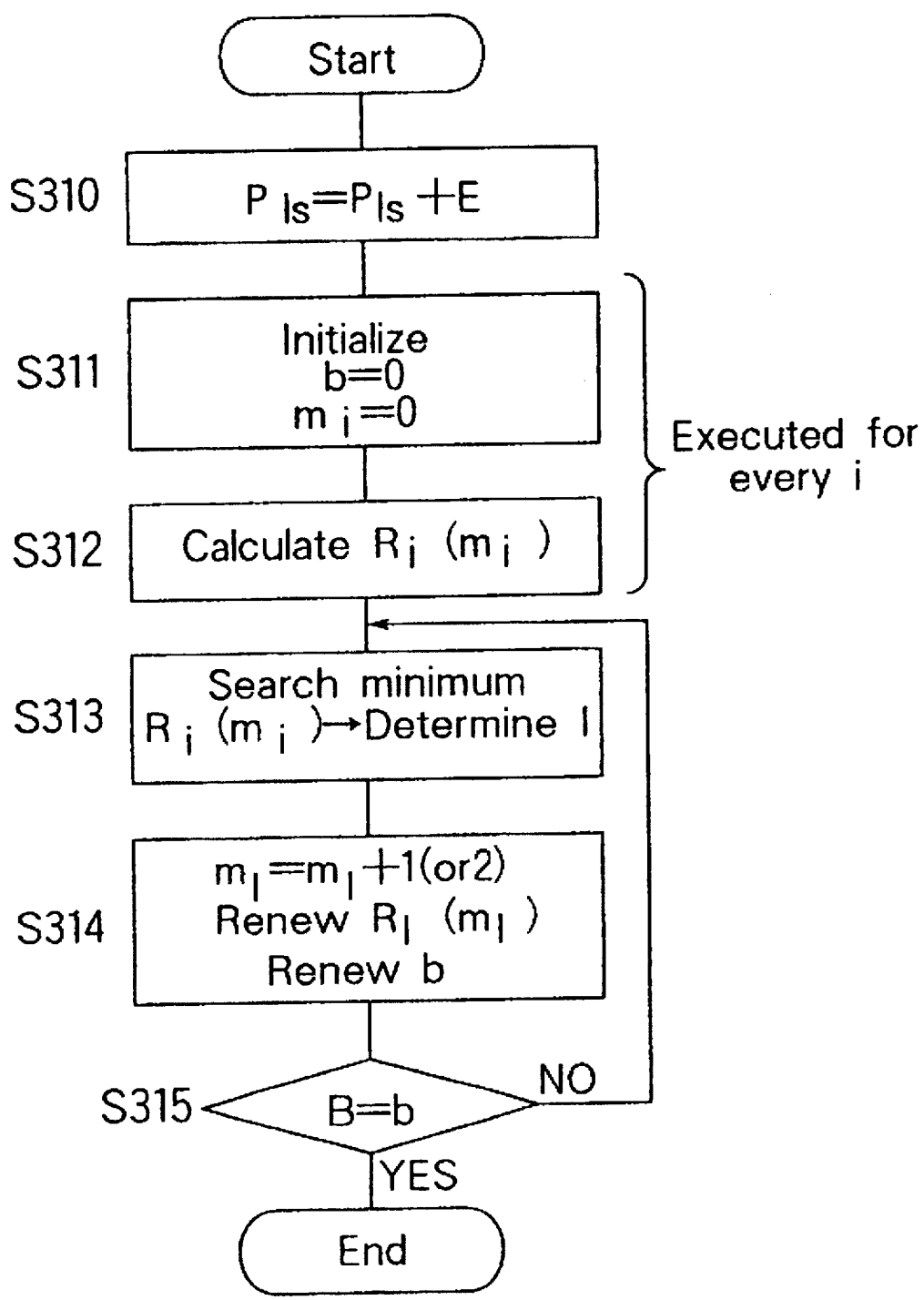
FIG. 13 is a flowchart of another procedure of allocating bits by means of the encoding and decoding apparatus of the fourth embodiment.
Figure 14A:
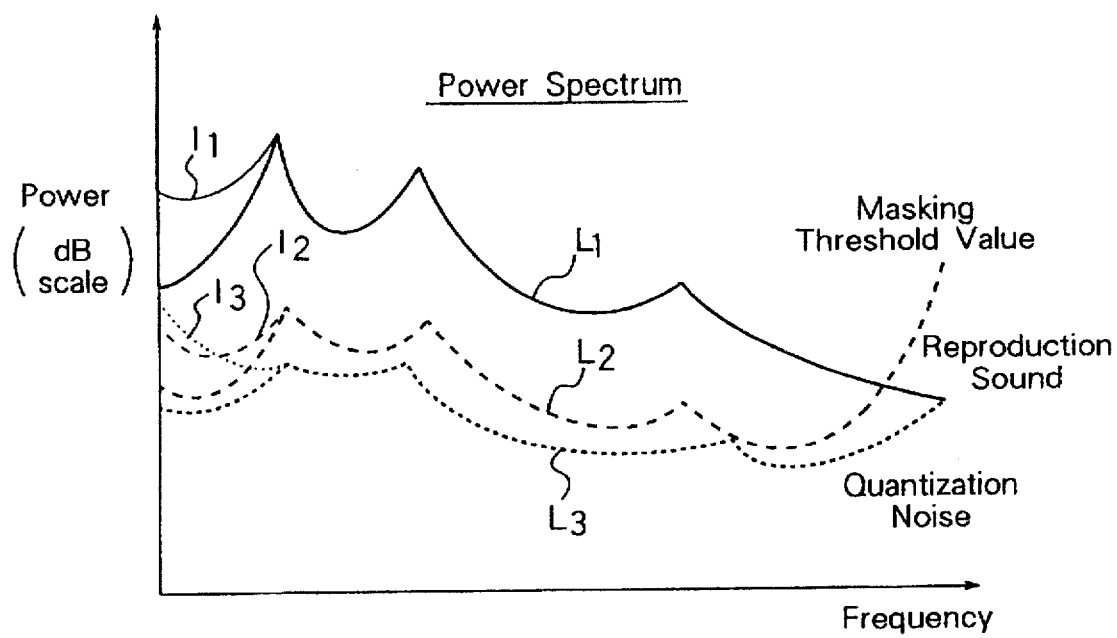
FIGS. 14A and 14B are graphs showing a power spectrum, a masking threshold value, and a quantization noise in regard to a reproduction sound and a quantization noise in the case where a bass boost is effected in a reproducing apparatus.
Figure 14B:
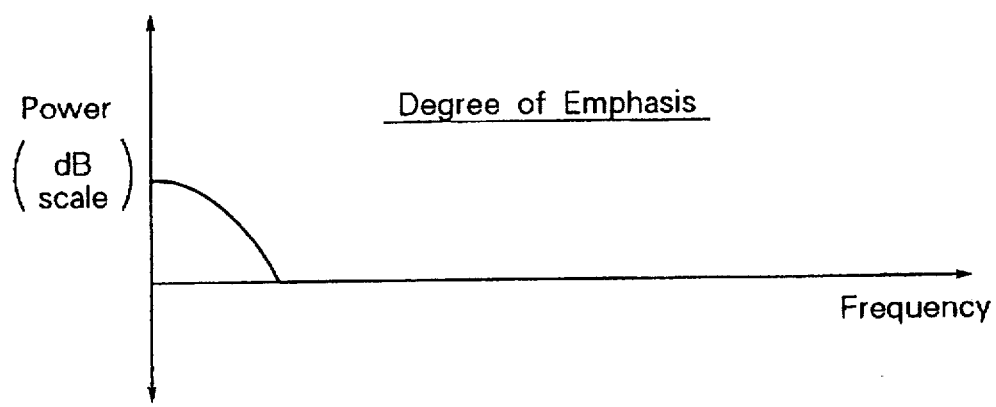

Therefore, the extra bit amount storing section 325 shown in FIG. 11 may have a value E itself to be emphasized in the reproduction stage instead of storing the bit amount. Practically, the bit allocation calculating section 326 and the extra bit amount storing section 325 determine the quantization bit amount of each frequency band according to a flowchart as shown in FIG. 13. In detail, firstly at S310, the value E stored in the extra bit amount storing section 325 is added in terms of decibel to the signal-to-masking threshold value ratio (SMR) $P_{Is}$ of the specified frequency band Is to be emphasized in the SMR calculating section 322. Subsequently, the same operations as in S301 through S305 of FIG. 12 are executed at S311 through S315 to execute the bit allocating operation. It is assumed that the total amount of bits allocatable in quantizing and coding the signals of each frequency band is B. Unlike the aforementioned example, the amount of extra bits to be allocated is not taken into account.

With the above-mentioned arrangement, more bits are to be allocated to the frequency band Is due to the increased part E of the signal-to-masking threshold value ratio (SMR) $P_{Is}$. When extra bits are allocated, the quantization noise of the frequency band Is is reduced in correspondence. As a result, the quantization noise can be prevented from exceeding the masking threshold value, and the quantization noise can be prevented from being perceived. Furthermore, the bit allocation in the present example is executed in consideration of a balance of the signal-to-masking threshold value ratio (SMR) of every frequency band, which means that the bits are allocated not merely in correspondence in amount with the quantity of the emphasis value E. When no signal component is included in the frequency band Is to be emphasized, the signal-to-masking threshold value ratio (SMR) $P_{I_s}$ is originally a negative infinite value or a value equivalent to the infinite value in terms of decibel. Therefore, the addition for the emphasis is ignored, and therefore no bit is allocated to the frequency band Is. The above-mentioned arrangement can eliminate the futility in the bit allocating operation. In the case where the signal itself or the quantization noise of the frequency band Is is masked by the signal of another frequency band even when the emphasis is effected, the masking threshold value-to-noise ratio (MNR) $R_{I_s}(0)$ at S312 prior to the bit allocation becomes greater than the ratio of another frequency band that is not masked (although the ratio has a value smaller than the value prior to the emphasis, it is yet greater than the MNR of the frequency band that is not masked). Therefore, less bits are allocated to the frequency band Is. Therefore, the futility in bit allocation due to the emphasis can be prevented.

It is to be noted that two or more features of the features of the aforementioned first embodiment through the fourth embodiment can be incorporated into an identical encoding and decoding apparatus.

Figure 15:
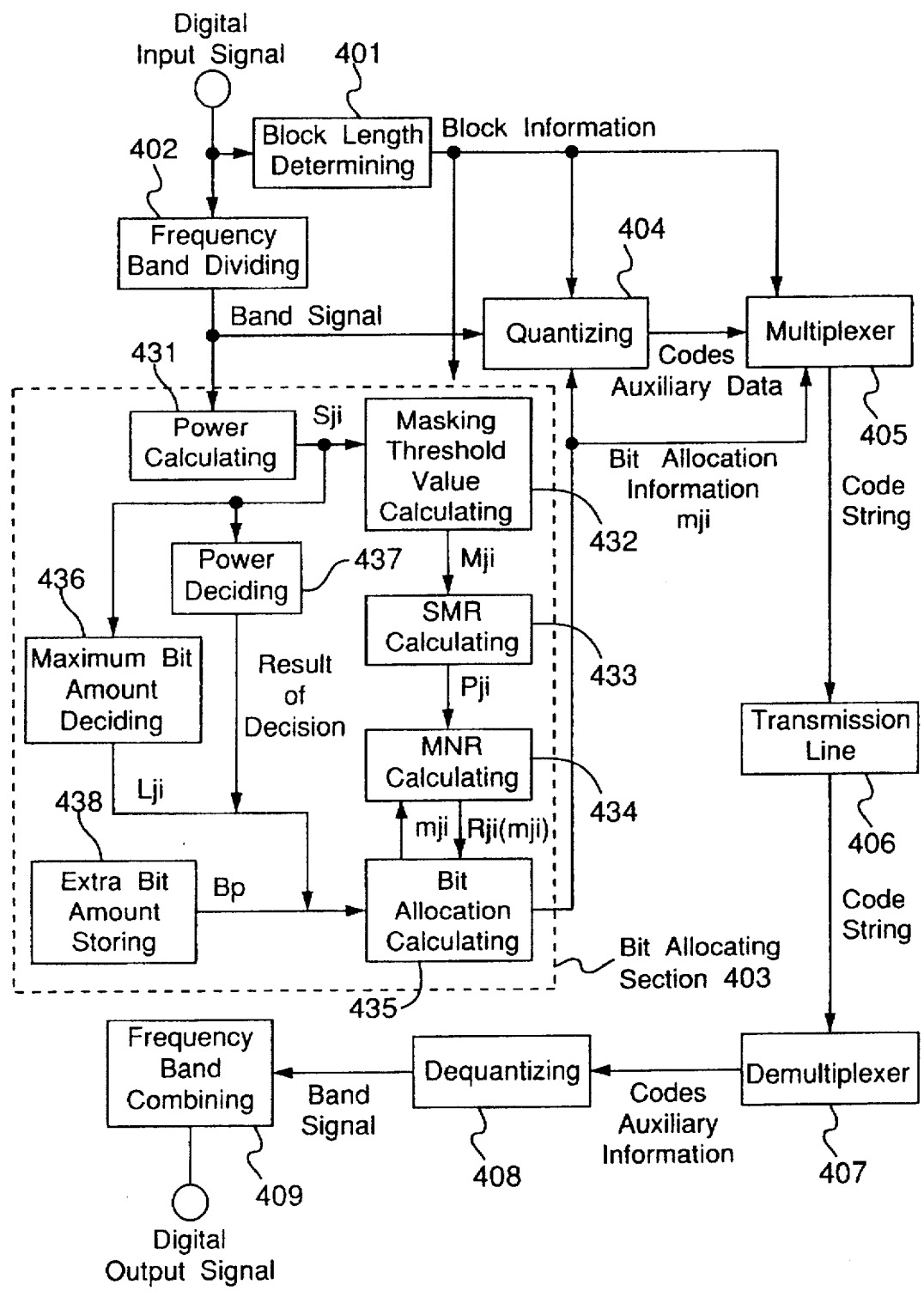
FIG. 15 is a block diagram of an encoding and decoding apparatus according to a fifth embodiment of the present invention.

FIG. 15 shows a block diagram of an encoding and decoding apparatus according to a fifth embodiment provided with all of the features of the first embodiment through the fourth embodiment.

The present encoding and decoding apparatus includes: an encoding section comprised of a block length determining section 401, a frequency band dividing section 402, a bit allocating section 403, a quantizing section 404, and a multiplexer 405; a transmission line 406; and a decoding section comprised of a demultiplexer 407, a dequantizing section 408, and a frequency band combining section 409. The bit allocating section 403 includes a power calculating section 431, a masking threshold value calculating section 432, an SMR calculating section 433, an MNR calculating section 434, a bit allocation calculating section 435, a maximum bit amount determining section 436, a power deciding section 437, and an extra bit amount storing section 438. The above-mentioned components have operations identical or similar to those of the components having the same names, i.e., the block length determining section 1, frequency band dividing section 2, bit allocating section 3, quantizing section 4, multiplexer 5, transmission line 6, demultiplexer 7, dequantizing section 8, frequency band combining section 9, power calculating section 31, masking threshold value calculating section 32, SMR calculating section 33, MNR calculating section 34, bit allocation calculating section 35 of the first embodiment (FIG. 1), the maximum bit amount determining section 125 of the second embodiment (FIG. 4), the power deciding section 225 of the third embodiment (FIG. 9), and the extra bit amount storing section 325 of the fourth embodiment (FIG. 11), respectively. Among the above-mentioned components, those which have utterly the same operations are not described herein. The maximum bit amount determining section 436 is a component which takes a block j into account on the basis of the maximum bit amount determining section 125 of the second embodiment, and operates to determine a maximum bit amount Lji in the frequency band i of the block j in the same manner as in the maximum bit amount determining section 125 of the second embodiment. The power deciding section 437 also takes the block j into account, and operates to determine whether some bits are to be preparatorily allocated to the frequency band i of the block j in the same manner as in the power deciding section 225 of the third embodiment.

Figure 16:
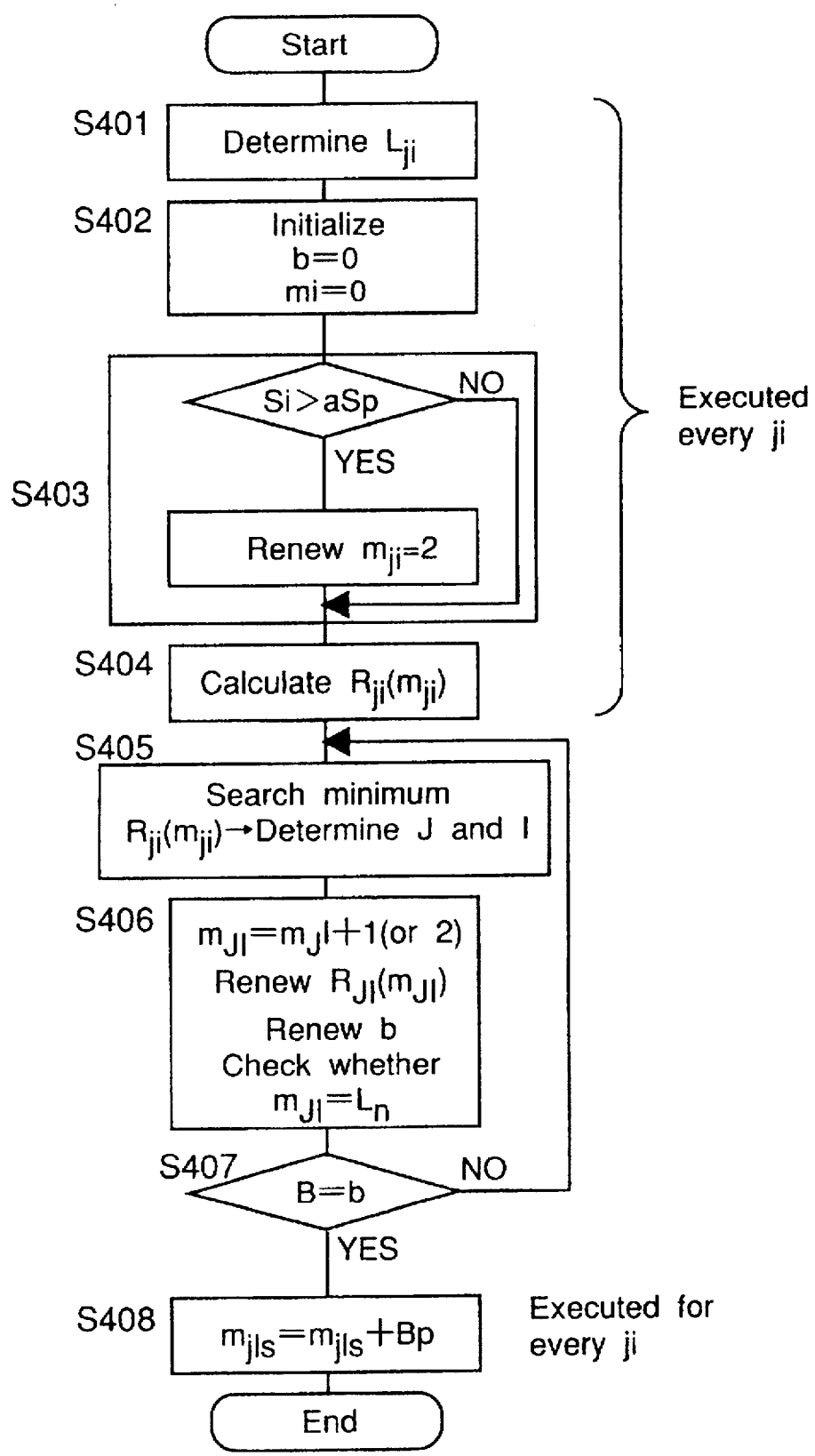
FIG. 16 is a flowchart of a procedure of allocating bits by means of the encoding and decoding apparatus of the fifth embodiment.

Then the following describes how the bit allocation calculating section 435 of the bit allocating section 403 determines the quantization bit amount mji of each frequency band i of each block j according to a flowchart as shown in FIG. 16. It is herein assumed that the total amount of bits allocatable in quantizing and coding the signal of each block and each frequency band is B. In detail, the total bit amount is determined by excluding a value of (the bit amount Bp stored in the extra bit amount storing section 438)×(the amount of objective signals to be quantized included in the frequency band Is)×(the amount of blocks) from the total original bit amount.

First at S401, the maximum bit amount determining section 436 determines the maximum amount Lji of bits allocatable to each frequency band of each block based on the power Sji of each frequency band of each block according to the method as described on the second embodiment. Then at S402, the bit allocation calculating section 435 is initialized. In detail, a number of 0 is entered into a variable b representing the total amount of allocated bits up to the present time. The quantization bit amount of each frequency band of each block is determined to be mji, and a number of 0 is entered into mji. Then at S403, the power deciding section 437 allocates the minimum quantization bit amount (normally 2) to mji in regard to the frequency band i of the block j in which the following inequality:

$$Sji > aSp$$

(where a is a constant satisfying $0 < a < 1$)

holds. Namely, mji is determined to be mji=2. Then at S404, Rji(mji) is calculated according to Equation (2) in the MNR calculating section 434. Then at S405, the minimum Rji(mji) is searched (the indexes j and i of the block and the frequency band at the above-mentioned time is determined to be J and I, respectively). Then at S406, a number of 1 (or the minimum quantization bit amount (normally 2) when mji is 0) is added to mji. Then it is checked whether a relationship of $m_{JI} = L_{JI}$ holds. When $m_{JI} = L_{JI}$, subsequently the frequency band I of the block J is excluded from the objects to be searched at S405. Further, $R_{JI}(m_{JI})$ is renewed according to Equation (2) in the MNR calculating section 434. Meanwhile, the same number as the amount of bits allocated to the frequency band I of the present block J is added to the variable b. In other words, (the amount of objective signals to be quantized included in the frequency band I of the block J)×1 (or the minimum quantization bit amount 2 when $m_{JI}$ is 0) is added to the variable b. Then at S407, it is checked whether the variable b coincides with the total amount B of the allocatable quantization bits. If they do not coincide with each other, the program flow returns to S405 to continue the bit allocating operation. When they coincide with each other, the program flow proceeds to S408. At S408, the bit amount Bp stored in the extra bit amount storing section 438 is added to the bit amount $mj_{I_s}$ of the specified frequency band Is of each block. In other words, extra bits are allocated to the specified frequency band Is, and the bit allocating operation is completed.

According to the encoding and decoding apparatus as described above, the features of the first embodiment through the fourth embodiment can be fully effected while not sacrificing the features in the least. In more detail, firstly, a varied psychoacoustic characteristic is adopted according to the block length. With the above-mentioned arrangement, when the block length is long, the psychoacoustic characteristic which produces a great masking effect though it requires a great amount of calculation, e.g., the simultaneous masking can be applied. When the block length is short, the psychoacoustic characteristic which produces a small masking effect though it requires a reduced amount of calculation, e.g., the temporal masking can be applied. In other words, an antinomic relationship between the amount of calculation and the accuracy of the masking threshold value can be overcome to allow an optimum psychoacoustic characteristic to be consistently adopted. Secondly, the maximum amount of bits allocated to each frequency band is limited every frequency band. With the above-mentioned arrangement, the maximum amount of allocatable quantization bits to the maximum bit amount of the frequency band $I_2$ having a small power located apart from the frequency band $I_1$ having a great power among the plural number of frequency bands can be limited regardless of the magnitude of the masking threshold value-to-noise ratio (MNR). Therefore, the bits which would have been allocated to the frequency band $I_2$ having a small power can be allocated more to another frequency band, in particular, the frequency band $I_1$ including a sine-wave signal. Thirdly, it is decided whether the ratio of the power of one frequency band to the power of all the frequency bands is not smaller than a specified ratio a, and at least the minimum quantization bit amount is allocated to the frequency band having a power not smaller than the specified ratio a. With the above-mentioned arrangement, the frequency band $I_4$ having a power not smaller than the specified ratio a is not completely deleted due to the power of the other frequency $I_3$. Therefore, no sense of incongruity is allowed to be given to a person who is excellent in auditory sense. Fourthly, the predetermined amount of extra bits are allocated to the predetermined specified frequency band Is. With the above-mentioned arrangement, the quantization noise in the frequency band Is can be reduced more than in the normal case. Therefore, when the noise is emphasized in the emphasizing process in a reproducing apparatus, the noise can be prevented from being perceived. Therefore, a high-quality reproduction sound can be provided.

Although these every embodiment can be individually implemented by hardware, it can be also implemented entirely by software operating on an apparatus such as a digital signal processor (DSP).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An encoding and decoding apparatus having an encoding section for encoding a digital input signal composed of a musical sound, a vocal sound, or a combination of the sounds, and a decoding section for decoding a signal encoded by the encoding section, wherein the encoding section comprises:

a block length determining section which time-sharingly divides the input signal into blocks each having a specified block length according to a degree of change of the input signal;

a frequency band dividing section which divides a signal of each of the blocks into a plurality of frequency bands to generate, for each, a respective frequency band signal;

a bit allocating section which obtains a masking threshold value-to-noise ratio from a magnitude of a power of each of the frequency bands reflecting a psychoacoustic characteristic, and determines an amount of quantization bits to be allocated to each of the frequency bands based on a magnitude of the masking threshold value-to-noise ratio; and a quantizing section which receives information representing the quantization bit amount from the bit allocating section, and quantizes the frequency band signal the bit allocating section comprises means for adopting a varied psychoacoustic characteristic according to the block length by receiving information representing the block length from the block length determining section.

2. An encoding and decoding apparatus having an encoding section for encoding a digital input signal composed of a musical sound, a vocal sound, or a combination of the sounds, and a decoding section for decoding a signal encoded by the encoding section, wherein the encoding section comprises:

a frequency band dividing section which divides the input signal into a plurality of frequency bands every specified time division unit to generate a frequency band signal;

a bit allocating section which obtains a masking threshold value-to-noise ratio from a magnitude of a power of each of the frequency bands reflecting a psychoacoustic characteristic, determines a number of quantization bits to be allocated to each of the frequency bands based on a magnitude of the masking threshold value-to-noise, and determines respective maximum numbers of bits to be respectively allocated to the frequency bands by the time division unit; and a quantizing section which receives information representing the quantization bit number from the bit allocating section, and quantizes the frequency band signal.

3. An encoding and decoding apparatus as claimed in claim 2, wherein said means of the bit allocating section determines, based on a ratio of a power of all the frequency bands to a power of one frequency band, the maximum amount of bits to be allocated to the one frequency band.

4. An encoding and decoding apparatus as claimed in claim 2, wherein said means of the bit allocating section determines, based on a magnitude of a power of one frequency band, the maximum amount of bits to be allocated to the one frequency band.

5. An encoding and decoding apparatus as claimed in claim 2, wherein said means of the bit allocating section determines, based on a ratio of a power of all the frequency bands to a power of one frequency band and a magnitude of the power of the one frequency band, the maximum amount of bits to be allocated to each of the frequency bands.

6. An encoding and decoding apparatus as claimed in claim 2, wherein the bit allocating section comprises means for releasing a limitation on the maximum amount of bits to be allocated to the one frequency band when the masking threshold value-to-noise ratio of the one frequency band is not greater than one.

7. An encoding and decoding apparatus as claimed in claim 2, wherein the bit allocating section comprises means for deciding whether the amount of bits allocated to each of the frequency bands is equal to the maximum bit amount when a total amount of allocated quantization bits does not reach a specified total amount of bits allocatable to all the frequency bands, and alleviating or releasing the limitation on the maximum bit amount when the amount of bits allocated to each of the frequency bands is equal to the maximum bit amount.

8. An encoding and decoding apparatus having a encoding section for encoding a digital input sisal composed of a musical sound, a vocal sound, or a combination of the sounds, and a decoding section for decoding a signal encoded by the encoding section, wherein the encoding section comprises:

a frequency band dividing section which divides the input signal into a plurality of frequency bands every specified time division unit to generate a frequency band signal;

a bit allocating section which obtains a masking threshold value-to-noise ratio from a magnitude of a power of each of the frequency bands reflecting a psychoacoustic characteristic, and determines a number of quantization bits to be allocated to each of the frequency bands, based on a magnitude of the masking threshold value-to-noise ratio; and a quantizing section which receives information representing the quantization bit number from the bit allocating section, and quantizes the frequency band signal, and wherein the bit allocating section includes an initial bit allocating part for deciding whether a ratio of a power of one frequency and to a power of all the frequency bands is not smaller than a specified ratio, and allocating at least a minimum number of quantization bits to the one frequency band having a power not smaller in ratio than the specified ratio, before allocating the quantization bits to each frequency band.

9. An encoding and decoding apparatus having an encoding section for encoding a digital input signal composed of a musical sound, a vocal sound, or a combination of the sounds, and a decoding section for decoding a signal encoded by the encoding section, wherein the encoding section comprises:

a frequency band dividing section which divides the input signal into a plurality of frequency bands every specified time division unit to generate a frequency band signal;

a bit allocating section which obtains a masking threshold value-to-noise ratio from a magnitude of a power of each of the frequency bands reflecting a psychoacoustic characteristic, and determines a number of quantization bits to be allocated to each of the frequency bands, based on a magnitude of the masking threshold value-to-noise ratio; and a quantizing section which receives information representing the quantization bit number from the bit allocating section, and quantizes the frequency band signal, and wherein the bit allocating section comprises means for allocating to the frequency bands a number of bits obtained by subtracting a number of extra bits to be allocated to the predetermined frequency band from a total number of quantization bits allocatable to all the frequency bands, and subsequently adding to a number of bits allocated to the predetermined frequency band the number of extra bits to be allocated.

10. An encoding and decoding apparatus as claimed in claim 9, wherein the bit allocating section comprises means for obtaining a signal-to-masking threshold value ratio of each of the frequency bands from a magnitude of a power of the frequency band, adding a predetermined value to the signal-to-masking threshold value ratio of the predetermined frequency band to obtain a modified signal-to-masking threshold value ratio, and thereafter obtaining the masking threshold value-to-noise ratio by means of the modified signal-to-masking threshold value ratio.

11. An encoding and decoding apparatus having an encoding section for encoding a digital input signal composed of a musical sound, a vocal sound, or a combination of the sounds, and a decoding section for decoding a signal encoded by the encoding section, wherein the encoding section comprises:

a block length determining section which time-sharingly divides the input signal into blocks each having a specified block length according to a degree of change of the input signal;

a frequency band dividing section which divides a signal of each of the blocks into a plurality of frequency bands to generate a frequency band signal;

a bit allocating section which obtains a masking threshold value-to-noise ratio from a magnitude of a power of each of the frequency bands reflecting a psychoacoustic characteristic, and determines an amount of quantization bits to be allocated to each of the frequency bands based on a magnitude of the masking threshold value-to-noise ratio; and a quantizing section which receives information representing the quantization bit amount from the bit allocating section, and quantizes the frequency band signal, and wherein the bit allocating section consists of two means selected from the group consisting of: means for adopting a varied psychoacoustic characteristic according to the block length by receiving information representing the block length from the block length determining section; means for limiting a maximum amount of bits to be allocated to each of the frequency bands every frequency band; means for deciding whether a ratio of a power of one frequency band to a power of all the frequency bands is not smaller than a specified ratio, and allocating at least a minimum amount of quantization bits to the one frequency band having a power not smaller in ratio than the specified ratio regardless of a magnitude of the masking threshold value-to-noise ratio; and means for allocating a predetermined amount of extra bits to a predetermined frequency band.

* * * * *